US012151246B2

(12) United States Patent
Chou et al.

(10) Patent No.: US 12,151,246 B2
(45) Date of Patent: *Nov. 26, 2024

(54) MOLECULAR MANIPULATION AND ASSAY WITH CONTROLLED TEMPERATURE

(71) Applicant: Essenlix Corporation, Monmouth Junction, NJ (US)

(72) Inventors: Stephen Y. Chou, Princeton, NJ (US); Wei Ding, East Windsor, NJ (US); Ji Qi, Lawrence Township, NJ (US); Yufan Zhang, Princeton, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/078,356

(22) PCT Filed: Feb. 14, 2018

(86) PCT No.: PCT/US2018/018108

§ 371 (c)(1),
(2) Date: Aug. 21, 2018

(87) PCT Pub. No.: WO2018/148764

PCT Pub. Date: Aug. 16, 2018

(65) Prior Publication Data

US 2019/0358635 A1 Nov. 28, 2019

Related U.S. Application Data

(60) Provisional application No. 62/456,596, filed on Feb. 8, 2017.

(51) Int. Cl.
*B01L 7/00* (2006.01)

(52) U.S. Cl.
CPC ........... *B01L 7/52* (2013.01); *B01L 2200/147* (2013.01); *B01L 2200/16* (2013.01);
(Continued)

(58) Field of Classification Search
CPC .. B01L 7/52; B01L 2200/16; B01L 2200/147; B01L 2300/12; B01L 2300/16;
(Continued)

(56) References Cited

U.S. PATENT DOCUMENTS

| | | | |
|---|---|---|---|
| 3,368,872 | A | 2/1968 | Natelson |
| 3,447,863 | A | 6/1969 | Patterson |

(Continued)

FOREIGN PATENT DOCUMENTS

| | | | |
|---|---|---|---|
| AU | 619459 | B | 1/1992 |
| CN | 1299466 | | 6/2001 |

(Continued)

OTHER PUBLICATIONS

Van Vliet, Dillys et al., Prediction of asthma exacerbations in children by innovative exhaled inflammatory markers: Results of a longitudinal study, PLOS ONE, Mar. 23, 2015, vol. 10. No. 3, e0119434.

(Continued)

*Primary Examiner* — Liban M Hassan

(57) ABSTRACT

A device and system for changing the temperature of a fluidic sample includes a first plate and a second plate movable relative to each other into an open configuration and a closed configuration, and spacers having a uniform height. The plates include a sample contact area for contacting the sample and have a configuration for changing the temperature of the sample. In the open configuration the plates are separated, and the sample is capable of being deposited onto the plates. In the closed configuration, the plates are parallel, the plates compress the sample into a layer of uniform thickness that is stagnant relative to the plates, the layer is confined by the sample contact areas of the plates and is regulated by the plates and the spacers, and
(Continued)

the plates are configured to change the temperature of the sample at a rate of at least 10° C./sec.

40 Claims, 6 Drawing Sheets

(52) U.S. Cl.
CPC .................. *B01L 2300/0663* (2013.01); *B01L 2300/0809* (2013.01); *B01L 2300/12* (2013.01); *B01L 2300/16* (2013.01); *B01L 2300/1805* (2013.01); *B01L 2300/1861* (2013.01)

(58) Field of Classification Search
CPC ..... B01L 2300/0663; B01L 2300/0809; B01L 2300/1805; B01L 2300/1861
See application file for complete search history.

(56) References Cited

U.S. PATENT DOCUMENTS

| | | | |
|---|---|---|---|
| 3,895,661 | A | 7/1975 | Praglin et al. |
| 3,925,166 | A | 12/1975 | Blume |
| 3,992,158 | A | 11/1976 | Przybylowicz et al. |
| 4,022,521 | A | 5/1977 | Hall et al. |
| 4,066,412 | A | 1/1978 | Johnson et al. |
| 4,088,448 | A | 5/1978 | Lilja et al. |
| 4,171,866 | A | 10/1979 | Tolles |
| 4,233,029 | A | 11/1980 | Columbus |
| 4,255,384 | A | 3/1981 | Kitajima et al. |
| 4,258,001 | A | 3/1981 | Pierce et al. |
| 4,329,054 | A | 5/1982 | Bachalo |
| 4,402,614 | A | 9/1983 | Porath |
| 4,427,294 | A | 1/1984 | Pietro |
| 4,430,436 | A | 2/1984 | Koyama et al. |
| 4,596,695 | A | 6/1986 | Cottingham |
| 4,745,075 | A | 5/1988 | Hadfield et al. |
| 4,806,311 | A | 2/1989 | Greenquist |
| 4,883,642 | A | 11/1989 | Bisconte |
| 4,906,439 | A | 3/1990 | Grenner |
| 4,911,782 | A | 3/1990 | Brown |
| 4,950,455 | A | 8/1990 | Smith |
| 5,002,736 | A | 3/1991 | Babbitt et al. |
| 5,039,487 | A | 8/1991 | Smith |
| 5,096,836 | A | 3/1992 | Macho et al. |
| 5,122,284 | A | 6/1992 | Braynin et al. |
| 5,132,097 | A | 7/1992 | Van Deusen et al. |
| 5,169,601 | A | 12/1992 | Ohta et al. |
| 5,188,968 | A | 2/1993 | Kano et al. |
| 5,223,219 | A | 6/1993 | Subramanian et al. |
| 5,281,540 | A | 1/1994 | Merkh et al. |
| 5,306,467 | A | 4/1994 | Douglas-Hamilton et al. |
| 5,321,975 | A | 6/1994 | Wardlaw |
| 5,362,648 | A | 11/1994 | Koreyasu et al. |
| 5,413,732 | A | 5/1995 | Buhl et al. |
| 5,427,959 | A | 6/1995 | Nishimura et al. |
| 5,431,880 | A | 7/1995 | Kramer |
| 5,591,403 | A | 1/1997 | Gavin et al. |
| 5,623,415 | A | 4/1997 | O'Bryan et al. |
| 5,753,456 | A | 5/1998 | Naqui et al. |
| 5,768,407 | A | 6/1998 | Shen et al. |
| 5,858,648 | A | 1/1999 | Steel et al. |
| 5,879,628 | A | 3/1999 | Ridgeway et al. |
| 5,888,834 | A | 3/1999 | Ishikawa et al. |
| 5,939,326 | A | 8/1999 | Chupp et al. |
| 5,948,686 | A | 9/1999 | Wardlaw |
| 6,004,821 | A | 12/1999 | Levine et al. |
| 6,016,367 | A | 1/2000 | Benedetti et al. |
| 6,017,767 | A | 1/2000 | Chandler |
| 6,022,734 | A | 2/2000 | Wardlaw |
| 6,083,761 | A | 7/2000 | Kedar et al. |
| 6,106,778 | A | 8/2000 | Oku et al. |
| 6,180,314 | B1 | 1/2001 | Berndt |
| 6,235,536 | B1 | 5/2001 | Wardlaw |
| 6,350,613 | B1 | 2/2002 | Wardlaw et al. |
| 6,358,475 | B1 | 3/2002 | Berndt |
| 6,429,027 | B1 | 8/2002 | Chee et al. |
| 6,503,760 | B2 | 1/2003 | Malmqvist et al. |
| 6,551,554 | B1 | 4/2003 | Vermeiden et al. |
| 6,623,701 | B1 | 9/2003 | Fichele et al. |
| 6,632,652 | B1 | 10/2003 | Austin et al. |
| 6,714,287 | B2 | 3/2004 | Berndt |
| 6,723,290 | B1 | 4/2004 | Wardlaw |
| 6,844,201 | B2 | 1/2005 | Malmqvist et al. |
| 6,866,823 | B2 | 3/2005 | Wardlaw |
| 6,869,570 | B2 | 3/2005 | Wardlaw |
| 6,893,850 | B2 | 5/2005 | Ostuni et al. |
| 6,921,514 | B1 | 7/2005 | Vetter et al. |
| 6,929,953 | B1 | 8/2005 | Wardlaw |
| 6,939,032 | B2 | 9/2005 | Cosby et al. |
| 7,101,341 | B2 | 9/2006 | Tsukashima et al. |
| 7,179,423 | B2 | 2/2007 | Bohm et al. |
| 7,282,367 | B2 | 10/2007 | Kawamura |
| 7,393,658 | B2 | 7/2008 | Carbonell et al. |
| 7,410,617 | B2 | 8/2008 | Sakamoto |
| 7,410,807 | B2 | 8/2008 | D'Aurora |
| 7,468,160 | B2 | 12/2008 | Thompson et al. |
| 7,510,841 | B2 | 3/2009 | Stuelpnagel et al. |
| 7,510,848 | B2 | 3/2009 | Hammond et al. |
| 7,547,424 | B2 | 6/2009 | Haab et al. |
| 7,731,901 | B2 | 6/2010 | Wardlaw |
| 7,738,094 | B2 | 6/2010 | Goldberg |
| 7,799,558 | B1 | 9/2010 | Dultz |
| 7,850,916 | B2 | 12/2010 | Wardlaw |
| 7,862,773 | B2 | 1/2011 | Ibrahim |
| 7,863,411 | B2 | 1/2011 | Hammond et al. |
| 7,897,376 | B2 | 3/2011 | Porter et al. |
| 7,901,897 | B2 | 3/2011 | Stuelpnagel et al. |
| 7,903,241 | B2 | 3/2011 | Wardlaw et al. |
| 7,929,121 | B2 | 4/2011 | Wardlaw et al. |
| 7,929,122 | B2 | 4/2011 | Wardlaw et al. |
| 7,943,093 | B2 | 5/2011 | Adrien et al. |
| 7,951,599 | B2 | 5/2011 | Levine et al. |
| 7,995,194 | B2 | 8/2011 | Wardlaw et al. |
| 8,045,165 | B2 | 10/2011 | Wardlaw et al. |
| 8,058,073 | B2 | 11/2011 | Chiapperi et al. |
| 8,077,296 | B2 | 12/2011 | Wardlaw et al. |
| 8,081,303 | B2 | 12/2011 | Levine et al. |
| 8,133,738 | B2 | 3/2012 | Levine et al. |
| 8,144,504 | B2 | 3/2012 | Kim et al. |
| 8,158,434 | B2 | 4/2012 | Wardlaw |
| 8,221,985 | B2 | 7/2012 | Wardlaw et al. |
| 8,241,572 | B2 | 8/2012 | Wardlaw |
| 8,269,954 | B2 | 9/2012 | Levine et al. |
| 8,284,384 | B2 | 10/2012 | Levine et al. |
| 8,287,820 | B2 | 10/2012 | Williams et al. |
| 8,310,658 | B2 | 11/2012 | Wardlaw et al. |
| 8,310,659 | B2 | 11/2012 | Wardlaw et al. |
| 8,319,954 | B2 | 11/2012 | Wardlaw et al. |
| 8,326,008 | B2 | 12/2012 | Lalpuria et al. |
| 8,338,579 | B2 | 12/2012 | Adams et al. |
| 8,361,799 | B2 | 1/2013 | Levine et al. |
| 8,367,012 | B2 | 2/2013 | Wardlaw |
| 8,462,332 | B2 | 6/2013 | Pugia et al. |
| 8,467,063 | B2 | 6/2013 | Wardlaw et al. |
| 8,472,693 | B2 | 6/2013 | Davis et al. |
| 8,481,282 | B2 | 7/2013 | Levine et al. |
| 8,502,963 | B2 | 8/2013 | Levine et al. |
| 8,513,032 | B2 | 8/2013 | Jablonski et al. |
| 8,569,076 | B2 | 10/2013 | Wardlaw et al. |
| 8,594,768 | B2 | 11/2013 | Phillips et al. |
| 8,604,161 | B2 | 12/2013 | Hammond et al. |
| 8,628,952 | B2 | 1/2014 | Stuelpnagel et al. |
| 8,633,013 | B2 | 1/2014 | Kaiser et al. |
| 8,638,427 | B2 | 1/2014 | Wardlaw et al. |
| 8,717,673 | B2 | 5/2014 | Selvin et al. |
| 8,741,630 | B2 | 6/2014 | Dickinson et al. |
| 8,750,966 | B2 | 6/2014 | Phillips et al. |
| 8,778,687 | B2 | 7/2014 | Levine et al. |
| 8,781,203 | B2 | 7/2014 | Davis et al. |
| 8,796,186 | B2 | 8/2014 | Shirazi |
| 8,797,527 | B2 | 8/2014 | Hukari et al. |
| 8,835,186 | B2 | 9/2014 | Jablonski et al. |

(56) References Cited

U.S. PATENT DOCUMENTS

| | | | | |
|---|---|---|---|---|
| 8,837,803 | B2 | 9/2014 | Wang et al. | |
| 8,842,264 | B2 | 9/2014 | Wardlaw et al. | |
| 8,885,154 | B2 | 11/2014 | Wardlaw et al. | |
| 8,906,700 | B2 | 12/2014 | Lim et al. | |
| 8,911,815 | B2 | 12/2014 | Kram et al. | |
| 8,974,732 | B2 | 3/2015 | Lalpuria et al. | |
| 8,994,930 | B2 | 3/2015 | Levine et al. | |
| 9,005,901 | B2 | 4/2015 | Gayda et al. | |
| 9,023,641 | B2 | 5/2015 | Rodriguez et al. | |
| 9,044,268 | B2 | 6/2015 | Phillips et al. | |
| 9,046,473 | B2 | 6/2015 | Levine et al. | |
| 9,084,995 | B2 | 7/2015 | Wardlaw | |
| 9,086,408 | B2 | 7/2015 | Egan et al. | |
| 9,097,640 | B2 | 8/2015 | Goldberg et al. | |
| 9,199,233 | B2 | 12/2015 | Wardlaw | |
| 9,274,094 | B2 | 3/2016 | Wardlaw et al. | |
| 9,291,617 | B2 | 3/2016 | Levine et al. | |
| 9,322,835 | B2 | 4/2016 | Wardlaw | |
| 9,347,962 | B2 | 5/2016 | Salsman | |
| 9,354,159 | B2 | 5/2016 | Vaartstra | |
| 9,395,365 | B2 | 7/2016 | Levine et al. | |
| 9,469,871 | B2 | 10/2016 | Bearinger et al. | |
| 9,523,670 | B2 | 12/2016 | Mueller et al. | |
| 9,696,252 | B2 | 7/2017 | Wardlaw | |
| 2001/0055882 | A1 | 12/2001 | Ostuni | |
| 2003/0068614 | A1 | 4/2003 | Cima et al. | |
| 2003/0107946 | A1 | 6/2003 | Cosby et al. | |
| 2003/0109059 | A1 | 6/2003 | Adrien et al. | |
| 2004/0131345 | A1 | 7/2004 | Kylberg et al. | |
| 2004/0156755 | A1 | 8/2004 | Levine | |
| 2004/0214310 | A1 | 10/2004 | Parker et al. | |
| 2004/0259162 | A1 | 12/2004 | Kappel et al. | |
| 2005/0026161 | A1 | 2/2005 | Jablonski et al. | |
| 2005/0032138 | A1 | 2/2005 | Lathrop et al. | |
| 2005/0158880 | A1 | 7/2005 | Ostuni et al. | |
| 2005/0254995 | A1 | 11/2005 | Sostek et al. | |
| 2006/0015157 | A1 | 1/2006 | Leong | |
| 2006/0051253 | A1 | 3/2006 | Gousepohl | |
| 2006/0062440 | A1 | 3/2006 | Hollars et al. | |
| 2006/0062695 | A1 | 3/2006 | Haab et al. | |
| 2006/0090658 | A1 | 5/2006 | Phillips | |
| 2006/0160134 | A1 | 7/2006 | Melker et al. | |
| 2007/0087442 | A1 | 4/2007 | Wardlaw | |
| 2007/0243117 | A1 | 10/2007 | Wardlaw | |
| 2008/0003650 | A1 | 1/2008 | Banerji | |
| 2008/0028962 | A1 | 2/2008 | Phillips et al. | |
| 2008/0180685 | A1 | 7/2008 | de Lega et al. | |
| 2008/0214947 | A1 | 9/2008 | Hunt et al. | |
| 2008/0274564 | A1 | 11/2008 | D'Aurora | |
| 2008/0286152 | A1 | 11/2008 | Schmidt et al. | |
| 2009/0211344 | A1 | 8/2009 | Wang | |
| 2009/0227472 | A1 | 9/2009 | Stuelpnagel et al. | |
| 2009/0233329 | A1 | 9/2009 | Rodriguez et al. | |
| 2009/0246781 | A1 | 10/2009 | Klem et al. | |
| 2009/0258371 | A1 | 10/2009 | Wardlaw et al. | |
| 2009/0298716 | A1 | 12/2009 | Stuelpnagel et al. | |
| 2010/0081583 | A1 | 4/2010 | Shirazi | |
| 2010/0085067 | A1 | 4/2010 | Gabriel et al. | |
| 2010/0151593 | A1 | 6/2010 | D'Aurora | |
| 2010/0216248 | A1 | 8/2010 | Wardlaw | |
| 2010/0255605 | A1 | 10/2010 | Wardlaw | |
| 2010/0272345 | A1 | 10/2010 | Wardlaw | |
| 2010/0273244 | A1 | 10/2010 | Wardlaw | |
| 2010/0291562 | A1 | 11/2010 | Adler | |
| 2011/0009297 | A1 | 1/2011 | Jones et al. | |
| 2011/0206557 | A1 | 8/2011 | Phan et al. | |
| 2011/0294198 | A1 | 12/2011 | Wardlaw | |
| 2012/0034647 | A1 | 2/2012 | Herzog et al. | |
| 2012/0100547 | A1* | 4/2012 | Danker ................ | C12Q 1/6851 435/6.12 |
| 2012/0107799 | A1 | 5/2012 | Daum | |
| 2012/0108787 | A1 | 5/2012 | Lue | |
| 2012/0157332 | A1 | 6/2012 | Kumar et al. | |
| 2012/0300293 | A1 | 11/2012 | Selvin et al. | |
| 2013/0052331 | A1 | 2/2013 | Kram et al. | |
| 2013/0065788 | A1 | 3/2013 | Glezer et al. | |
| 2013/0102018 | A1 | 4/2013 | Schentag et al. | |
| 2013/0157288 | A1 | 6/2013 | Kilfeather et al. | |
| 2013/0189671 | A1* | 7/2013 | Hoh ....................... | C12M 23/34 435/297.1 |
| 2013/0209332 | A1 | 8/2013 | Wardlaw | |
| 2013/0265054 | A1 | 10/2013 | Lowery et al. | |
| 2013/0309679 | A1 | 11/2013 | Ismagilov et al. | |
| 2014/0315242 | A1 | 10/2014 | Rodriguez et al. | |
| 2014/0323330 | A1 | 10/2014 | Bergo | |
| 2014/0368631 | A1 | 12/2014 | Wardlaw et al. | |
| 2015/0036131 | A1 | 2/2015 | Salsman | |
| 2015/0184235 | A1* | 7/2015 | Reda ................. | B01L 3/502715 506/9 |
| 2015/0253321 | A1 | 9/2015 | Chou et al. | |
| 2015/0259212 | A1* | 9/2015 | Li .......................... | B82Y 40/00 428/221 |
| 2015/0317506 | A1 | 11/2015 | Xie et al. | |
| 2015/0323519 | A1 | 11/2015 | Wardlaw | |
| 2015/0328633 | A1* | 11/2015 | Yoo ................... | B01L 3/502715 435/6.12 |
| 2016/0025637 | A1 | 1/2016 | Halverson et al. | |
| 2016/0033496 | A1 | 2/2016 | Chou et al. | |
| 2016/0245797 | A1 | 8/2016 | Ahmad et al. | |
| 2016/0266091 | A1 | 9/2016 | Levine et al. | |
| 2016/0350914 | A1 | 12/2016 | Champlin et al. | |
| 2017/0021356 | A1 | 1/2017 | Dority et al. | |
| 2017/0038401 | A1 | 2/2017 | Holmes et al. | |
| 2017/0045504 | A1 | 2/2017 | Bloom | |

FOREIGN PATENT DOCUMENTS

| | | | |
|---|---|---|---|
| CN | 1302229 | 7/2001 | |
| CN | 1166950 | 9/2004 | |
| CN | 1188217 | 2/2005 | |
| CN | 101004287 A | 7/2007 | |
| CN | 102027369 | 4/2011 | |
| CN | 203096061 U | 7/2013 | |
| EP | 0961110 | 12/1999 | |
| EP | 2290100 | 3/2011 | |
| EP | 2439515 | 4/2012 | |
| EP | 2554987 | 2/2013 | |
| EP | 2848196 | 3/2015 | |
| EP | 3026433 | 6/2016 | |
| WO | 1991020009 | 12/1991 | |
| WO | 1991020009 A1 | 12/1991 | |
| WO | 1999044743 | 9/1999 | |
| WO | 1999045385 | 9/1999 | |
| WO | 2005114145 | 12/2005 | |
| WO | 2005100539 | 1/2006 | |
| WO | 2007112332 | 10/2007 | |
| WO | 2007132002 A1 | 11/2007 | |
| WO | 2009117652 | 9/2009 | |
| WO | 2009117664 | 9/2009 | |
| WO | 2009117678 | 9/2009 | |
| WO | 2009117682 | 9/2009 | |
| WO | 2009124186 | 10/2009 | |
| WO | 2009124190 | 10/2009 | |
| WO | 2009126800 | 10/2009 | |
| WO | 2010115026 | 10/2010 | |
| WO | 2011088588 A1 | 7/2011 | |
| WO | 2014055559 | 4/2014 | |
| WO | 2014089468 | 6/2014 | |
| WO | 2014183049 | 11/2014 | |
| WO | 2014205576 | 12/2014 | |
| WO | 2017027643 | 2/2017 | |
| WO | 2017048871 | 3/2017 | |
| WO | 2017048871 A1 | 3/2017 | |
| WO | 2017048881 | 3/2017 | |
| WO | WO-2017048881 A1 * | 3/2017 | ........... A61B 5/0836 |

OTHER PUBLICATIONS

Written Opinion for PCT/US2018/017713 established by ISA/KR, mailed on Jun. 20, 2018.

Van Vliet, Dillys et al., Prediction of asthma exacerbations in children by innovative exhaled inflammatory markers: Results of a longitudinal study, PLOS ONE, Mar. 23, 2015.

(56) References Cited

OTHER PUBLICATIONS

Written Opinion for PCT/US2018/018108 established by ISA/US, mailed on May 4, 2018.
Sun, Wei et al., Rapid antimicrobial susceptibility test for identification of new therapeutics and drug combinations against multidrug-resistant bacteria, Emerg. Microbes Infect., Nov. 9, 2016.
Jahanmehr, S A H et al., Simple technique for fluorescence staining of blood cells with acridine orange, Technical Methods, Feb. 12, 1987.

* cited by examiner

MOLECULAR MANIPULATION AND ASSAY WITH CONTROLLED TEMPERATURE

CROSS-REFERENCING

This application claims the benefit of provisional application Ser. Nos. 62/456,596, filed on Feb. 8, 2017, the complete disclosure of which is incorporated by reference herein in its entirety.

BACKGROUND

In certain chemical, biological and/or medical assays, repeated thermal cycles and rapid and precise temperature controls need to be implemented. One particular example is the polymerase chain reaction (PCR) for amplifying predetermined nucleotides (e.g. DNA) in one or more samples. In a PCR, the samples are repeatedly heated and cooled to specific temperatures following a pre-set thermal control cycle. In certain scenarios, it is desirable to that the temperature of the samples can be changed rapidly and uniformly.

SUMMARY OF INVENTION

The following brief summary is not intended to include all features and aspects of the present invention. The present invention provides devices, systems, and methods for rapid sample thermal cycle changes for the facilitation of reactions such as but not limited to PCR. One aspect of the present invention is to use two movable thin plates to compress a liquid sample into a uniform thin layer. Another aspect of the present invention is to spacers to control the final sample thickness. Another aspect of the present invention is the devices and system for rapid sample temperature changing and bio/chemistry for nucleic acid amplification.

BRIEF DESCRIPTION OF THE DRAWINGS

The skilled artisan will understand that the drawings, described below, are for illustration purposes only. The drawings are not intended to limit the scope of the present teachings in any way. The drawings are not entirely in scale. In the figures that present experimental data points, the lines that connect the data points are for guiding a viewing of the data only and have no other means.

DETAILED DESCRIPTION OF EXEMPLARY EMBODIMENTS

The following detailed description illustrates some embodiments of the invention by way of example and not by way of limitation. If any, the section headings and any subtitles used herein are for organizational purposes only and are not to be construed as limiting the subject matter described in any way. The contents under a section heading and/or subtitle are not limited to the section heading and/or subtitle, but apply to the entire description of the present invention.

The citation of any publication is for its disclosure prior to the filing date and should not be construed as an admission that the present claims are not entitled to antedate such publication by virtue of prior invention. Further, the dates of publication provided can be different from the actual publication dates which can need to be independently confirmed.

It should be noted that the Figures do not intend to show the elements in strict proportion. For clarity purposes, some elements are enlarged when illustrated in the Figures. The dimensions of the elements should be delineated from the descriptions herein provided and incorporated by reference.

QMAX-Device

The terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF) that regulate the spacing between the plates. The term "X-plate" refers to one of the two plates in a CROF card, wherein the spacers are fixed to this plate. More descriptions of the COF Card, CROF Card, and X-plate are described in the provisional application Ser. No. 62/456,065, filed on Feb. 7, 2017, the complete disclosure of which is incorporated by reference herein in its entirety for all purposes.

Figure 1:
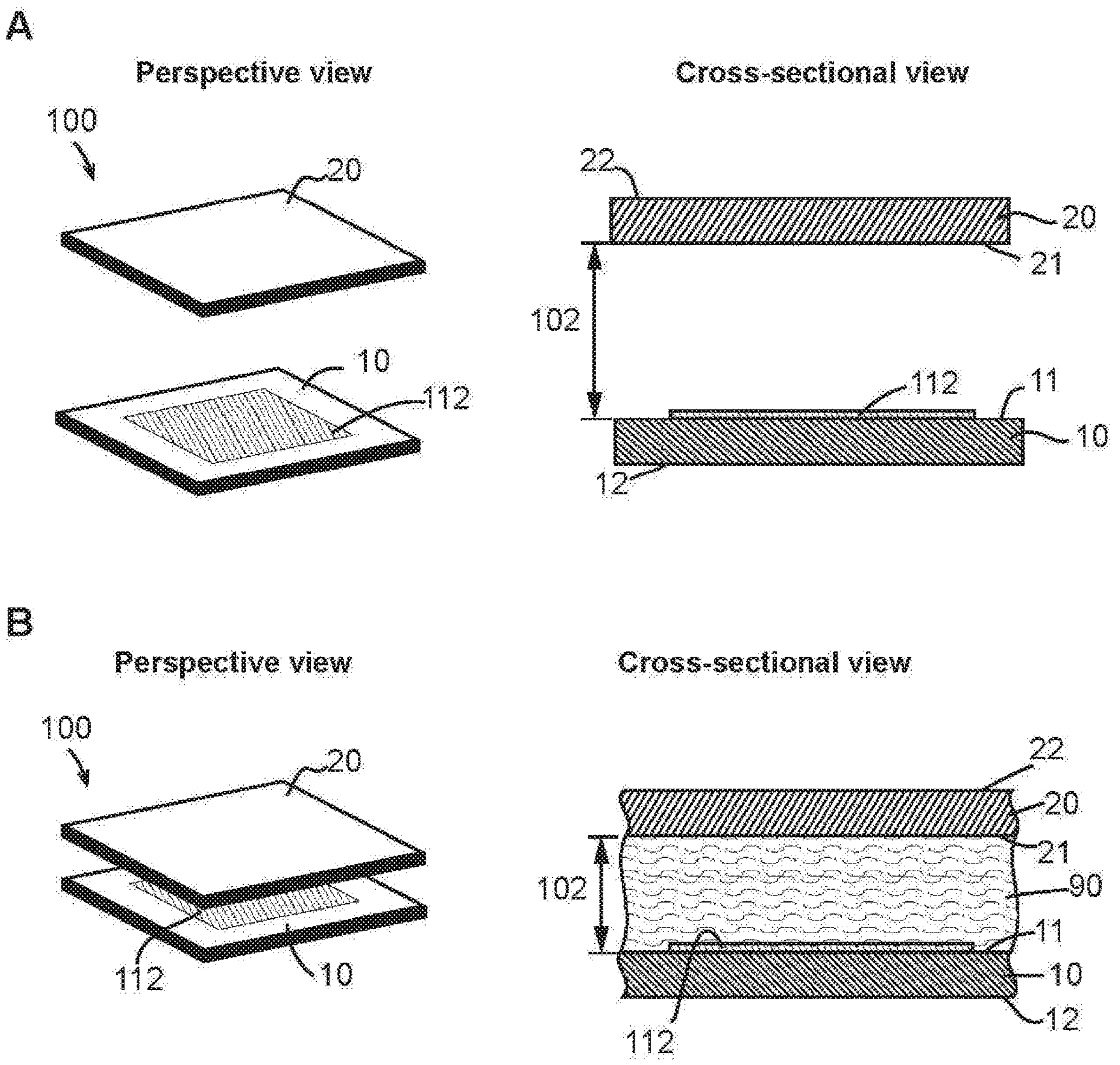
FIG. 1A shows a perspective and sectional view of an embodiment of the device, illustrating an embodiment of the device in an open configuration according to one embodiment of the present disclosure.
FIG. 1B shows a perspective and sectional view of an embodiment of the device, illustrating the device when the sample unit is in a closed configuration, where the temperature of a sample that is compressed into a thin layer between two plates is rapidly changed by a radiation source that is positioned to project electromagnetic waves onto the sample according to one embodiment of the present disclosure.

FIG. 1 shows perspective and sectional views of an embodiment of the device of the present invention. Panel (A) illustrates the device (also termed "sample unit" of the system) 100 in an open configuration. As shown in panel (A), the sample unit 100 comprises a first plate 10, a second plate 20, and a spacing mechanism (not shown). The first plate 10 and second plate 20 respectively comprise an outer surface (11 and 21, respectively) and an inner surface (12 and 22, respectively). Each inner surface has a sample contact area (not indicated) for contacting a fluidic sample to be processed and/or analyzed by the device.

The first plate 10 and the second plate 20 are movable relative to each other into different configurations. One of the configurations is the open configuration, in which, as shown in FIG. 1 panel (A), the first plate 10 and the second plate 20 are partially or entirely separated apart, and the spacing between the first plate 10 and the second plate 20 (i.e. the distance between the first plate inner surface 11 and the second plate inner surface 21) is not regulated by the spacing mechanism. The open configuration allows a sample to be deposited on the first plate, the second plate, or both, in the sample contact area.

As shown in panel (A) of FIG. 1, the first plate 10 further comprises a radiation absorbing layer 112 in the sample contact area. It is also possible that the second plate 20 alternatively or additionally comprise the radiation absorbing layer 112. In some embodiments, the radiation absorbing layer 112 is configured to efficiently absorb radiation (e.g. electromagnetic waves) shed on it. The absorption percentage is 50% or more, 60% or more, 70% or more, 80% or more, 90% or more, 95% or more, 99% or more, 100% or less, 85% or less, 75% or less, 65% or less, or 55% or less, or in a range between any of the two values. The radiation absorbing layer 112 is further configured to convert at least a substantial portion of the absorbed radiation energy into heat (thermal energy). For example, the radiation absorbing layer 112 is configured to emit radiation in the form of heat after absorbing the energy from electromagnetic waves. The term "substantial portion" or "substantially" as used herein refers to a percentage that is 50% or more, 60% or more, 70% or more, 80% or more, 90% or more, 95% or more, 99% or more, 99% or more, or 99.9% or more.

In some embodiments, the radiation absorbing layer 112 comprise materials/structures, such as, but not limited to, metallic plasmonic surface, metamaterials, black silicon, graphite, carbon nanotube, silicon sandwich, graphene, superlattice, plasmonic materials, any material/structure that is capable of efficiently absorbing the electromagnetic wave and converting the absorbed energy into thermal energy, and any combination thereof. In certain embodiments, the radiation absorbing layer 112 comprise carbon nanotube.

In some embodiments, the radiation absorbing layer comprise a dot-coupled-dots-on-pillar antenna (D2PA) array, such as, but not limited to the D2PA array described in U.S. Provisional Patent Application No. 61/347,178, which was filed on May 21, 2010, U.S. Provisional Patent Application 61/622,226, which was filed on Apr. 10, 2012, U.S. Provisional Patent Application No. 61/801,424, which was filed on Mar. 15, 2013, U.S. Provisional Patent Application No. 61/801,096, which was filed on Mar. 15, 2013, U.S. Provisional Patent Application No. 61/801,933, which was filed on Mar. 15, 2013, U.S. Provisional Patent Application No. 61/794,317, which was filed on Mar. 15, 2013, U.S. Provisional Patent Application No. 62/090,299, which was filed on Dec. 10, 2014, U.S. Provisional Patent Application No. 61/708,314, which was filed on Oct. 1, 2012, PCT Application No. PCT/US2011/037455, which was filed on May 20, 2011, PCT Application No. PCT/US2013/032347, which was filed on Mar. 15, 2013, PCT Application No. PCT/US2014/029979, which was filed on Mar. 15, 2014, PCT Application No. PCT/US2014/028417, which was filed on Mar. 14, 2014, PCT Application No. PCT/US2014/030108, which was filed on Mar. 16, 2014, PCT Application No. PCT/US2013/062923, which was filed on Oct. 1, 2013, U.S. patent application Ser. No. 13/699,270, which was filed on Jun. 13, 2013, U.S. patent application Ser. No. 14/459,239, which was filed on Aug. 13, 2014, U.S. patent application Ser. No. 14/871,678, which was filed on Sep. 30, 2015, U.S. patent application Ser. No. 13/838,600, which was filed on Mar. 15, 2013, U.S. patent application Ser. No. 14/459,251, which was filed on Aug. 13, 2014, U.S. patent application Ser. No. 14/668,750, which was filed on Mar. 25, 2015, U.S. patent application Ser. No. 14/775,634, which was filed on Sep. 11, 2015, U.S. patent application Ser. No. 14/775,638, which was filed on Sep. 11, 2015, U.S. patent application Ser. No. 14/852,412, which was filed on Mar. 16, 2014, U.S. patent application Ser. No. 14/964,394, which was filed on Dec. 9, 2015, U.S. patent application Ser. No. 14/431,266, which was filed on Oct. 5, 2015, the complete disclosures of which are hereby incorporated by reference for all purposes.

Panel (B) of FIG. 1 shows perspective and sectional views of the sample unit 100 when it is in a closed configuration. The sectional view illustrates part of the device without showing the entirety of the sample unit 100 or the spacing mechanism. As shown in panel (B), the sample unit 100 comprise a first plate 10, a second plate 20, and a spacing mechanism (not shown). In FIG. 1 panel (B), the first plate 10 and the second plate 20 are in a closed configuration. In the closed configuration, the inner surfaces of the two plates 11 and 21 face each other, and the spacing between the two plates 102 is regulated by the spacing mechanism. Consequently, as shown in the figure, the two plates compress a fluidic sample 90 that is deposited on one or both of the plates into a layer, and the thickness of the layer is regulated by the spacing mechanism (not illustrated).

In some embodiments, in order to achieve fast and uniform thermal change in a sample, the sample is compressed into a thin layer. The thickness of the layer is 500 μm or less, 200 μm or less, 100 μm or less, 50 μm or less, 20 μm or less, 10 μm or less, 5 μm or less, 2 μm or less, 1 μm or less, 500 nm or more, 1.5 μm or more, 2.5 μm or more, 7.5 μm or more, 15 μm or more, 30 μm or more, 75 μm or more, 150 μm or more, or 250 μm or more. The small thickness of the sample layer result in a faster diffusion of reagents and/or faster transduction of heat. In some embodiments, the two plates are compressed by an imprecise pressing force, which is neither set to a precise level nor substantially uniform. In certain embodiments, the two plates are pressed directly by a human hand.

As shown in the cross-sectional views of the device in FIG. 1, the radiation absorbing layer 112 spans across the sample contact area. It should be noted, however, it is also possible that the lateral area of the radiation absorbing layer occupy only a portion of the sample contact area at a percentage about 1% or more, 5% or more, 10% or more, 20% or more, 50% or more, 80% or more, 90% or more, 95% or more, 99% or more, 85% or less, 75% or less, 55% or less, 40% or less, 25% or less, 8% or less, 2.5% or less. In some embodiments, in order to facilitate the temperature change of the sample, in some embodiments the lateral area of the radiation absorbing layer is configured so that the sample 90 receive the thermal radiation from the radiation absorbing layer 112 substantially uniformly across the lateral dimension of the sample 90 over the sample contact area.

In some embodiments, the radiation absorbing layer 112 have a thickness of 10 nm or more, 20 nm or more, 50 nm or more, 100 nm or more, 200 nm or more, 500 nm or more, 1 μm or more, 2 μm or more, 5 μm or more, 10 μm or more, 20 μm or more, 50 μm or more, 100 μm or more, 75 μm or less, 40 μm or less, 15 μm or less, 7.5 μm or less, 4 μm or less, 1.5 μm or less, 750 nm or less, 400 nm or less, 150 nm or less, 75 nm or less, 40 nm or less, or 15 nm or less, or in a range between any of the two values. In certain embodiments, the radiation absorbing layer 112 have thickness of 100 nm or less.

In some embodiments, the area of the sample layer and the radiation absorbing layer 112 is substantially larger than the uniform thickness. Here, the term "substantially larger" means that the general diameter or diagonal distance of the sample layer and/or the radiation absorbing layer is at least 10 time, 15 times, 20 time, 25 times, 30 time, 35 times, 40 time, 45 times, 50 time, 55 times, 60 time, 65 times, 70 time, 75 times, 80 time, 85 times, 90 time, 95 times, 100 time, 150 times, 200 time, 250 times, 300 time, 350 times, 400 time, 450 times, 500 time, 550 times, 600 time, 650 times, 700 time, 750 times, 800 time, 850 times, 900 time, 950 times, 1000 time, 1500 times, 2000 time, 2500 times, 3000 time, 3500 times, 4000 time, 4500 times, or 5000 time, or in a range between any of the two values.

System Including QMAX Device

Figure 2:
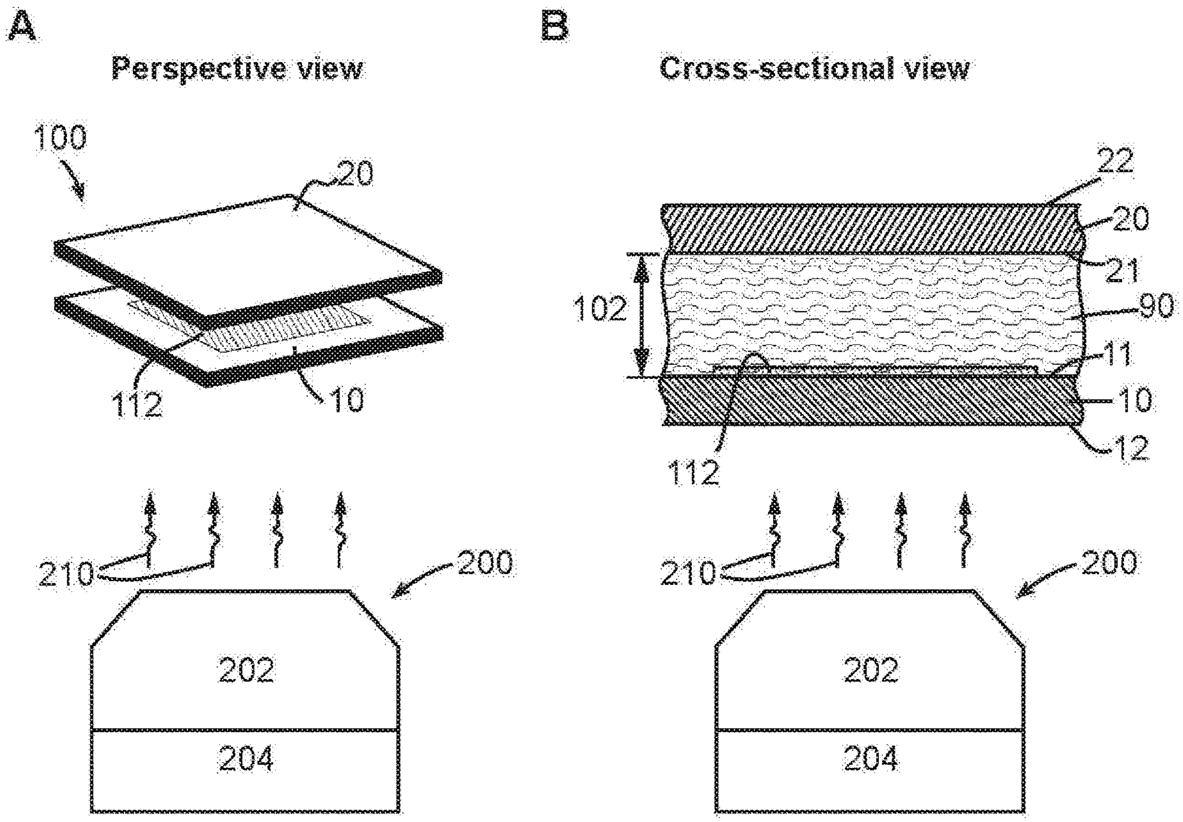
FIG. 2A shows a perspective view of an embodiment of the system, illustrating the system when the device (sample unit of the system) is in an open configuration according to one embodiment of the present disclosure.
FIG. 2B shows a sectional view of an embodiment of the system, illustrating the system when the sample unit is in a closed configuration according to one embodiment of the present disclosure.

FIG. 2 shows perspective and sectional views of an embodiment of the system of the present invention. As shown in panels (A) and (B), the system comprise a sample unit 100 and a thermal control unit 200; the sample unit 100 comprise a first plate 10, a second plate 20, and a spacing mechanism (not shown); the thermal control unit 200 comprise a radiation source 202 and controller 204. Panels (A) and (B) of FIG. 2 illustrate the perspective view and sectional view of the system when the sample unit 100 of the system is in a closed configuration.

As shown in panel (B) of FIG. 1, the thermal control unit 200 comprise a radiation source 202 and controller 204. In some embodiments, the thermal control unit 200 provide the energy in the form of electromagnetic waves for temperature change of the sample.

Referring to both panels (A) and (B) of FIG. 2, the radiation source 202 is configured to project an electromagnetic wave 210 to the radiation absorbing layer 112 of the sample unit 100, which is configured to absorb the electromagnetic wave 210 and convert a substantial portion of the electromagnetic wave 210 into heat, resulting in thermal radiation that elevate the temperature of a portion of the sample 90 that is in proximity of the radiation absorbing layer 112. In other words, the coupling of the radiation source 202 and the radiation absorbing layer 112 is configured to generate the thermal energy that is needed to facilitate the temperature change of the sample 90.

In some embodiments, the radiation from the radiation source 202 comprise radio waves, microwaves, infrared waves, visible light, ultraviolet waves, X-rays, gamma rays, or thermal radiation, or any combination thereof. In some embodiments, the radiation absorbing layer 112 has a preferred range of light wavelength at which the radiation absorbing layer 112 has the highest absorption efficiency. In some embodiments, the radiation source 202 is configured to project the electromagnetic wave at a wavelength range within, overlapping with, or enclosing the preferred wavelength range of the radiation absorbing layer 112. In other embodiments, in order to facilitate the temperature change, the wavelength is rationally designed away from the preferred wavelength of the radiation absorbing layer.

In some embodiments, the radiation source 202 comprise a laser source providing a laser light within a narrow wavelength range. In other embodiments, the radiation source 202 comprises a LED (light-emitting diode) of a plurality thereof.

Referring to panels (A) and (B) of FIG. 2, the controller 204 is configured to control the electromagnetic wave 210 projected from the radiation source 202 for the temperature change of the sample. The parameters of the electromagnetic wave 210 that the controller 204 controls include, but are not limited to, the presence, intensity, wavelength, incident angle, and any combination thereof. In some embodiments, the controller is operated manually, for instance, it is as simple as a manual switch that controls the on and off of the radiation source, and therefore the presence of the electromagnetic wave projected from the radiation source. In other embodiments, the controller includes hardware and software that are configured to control the electromagnetic wave automatically according to one or a plurality of pre-determined programs.

In some embodiments, the pre-determined program refers to a schedule in which the parameter(s) (e.g. presence, intensity, and/or wavelength) of the electromagnetic wave 210 is/are set to pre-determined levels for respective pre-determined periods of time. In other embodiments, the pre-determined program refers to a schedule in which the temperature of the sample 90 is set to pre-determined levels for respective pre-determined periods of time and the time periods for the change of the sample temperature from one pre-determined level to another pre-determined level are also set respectively. In some embodiments, the controller 204 is configured to be programmable, which means the controller 204 comprises hardware and software that are configured to receive and carry out pre-determined programs for the system that are delivered by the operator of the system.

The thermal cycler system and associated methods of the present invention is used to facilitate a chemical, biological or medical assay or reaction. In some embodiments, the reaction requires temperature changes. In some embodiments, the reaction requires or prefers rapid temperature change in order to avoid non-specific reaction and/or reduce wait time. In certain embodiments, the system and methods of the present invention is used to facilitate a reaction that requires cyclical temperature changes for amplification of a nucleotide in a fluidic sample; such reactions includes but not is limited to polymerase chain reaction (PCR). The descriptions below use PCR as an example to illustrate the capability and utilization of the thermal cycler system and method of the present invention. It is should be noted, however, some embodiments of the device, systems and method herein described also apply to other assays and/or reactions that require temperature control and change.

Referring to panel (B) of FIG. 2, in some embodiments, the sample 90 is a pre-mixed reaction medium for polymerase chain reaction (PCR). For example, in certain embodiments, the reaction medium includes components such as but not limited to: DNA template, two primers, DNA polymerase (e.g. Taq polymerase), deoxynucleoside triphosphates (dNTPs), bivalent cations (e.g. $Mg^{2+}$), monovalent cation (e.g. $K^{+}$), and buffer solution. The specific components, the concentrations of each component, and the overall volume varies according to rational design of the reaction.

In some embodiments, the PCR assay requires a number of changes/alterations in sample temperature between the following steps: (i) the optional initialization step, which requires heating the sample to 92-98° C.; (2) the denaturation step, which requires heating the sample to 92-98° C.; (3) the annealing step, which requires lowering the sample temperature to 50-65° C.; (4) extension (or elongation) step, which requires heating the sample to 75-80° C.; (5) repeating steps (2)-(4) for about 20-40 times; and (6) completion of the assay and lowering the temperature of the sample to ambient temperature (e.g. room temperature) or cooling to about 4° C. The specific temperature and the specific time period for each step varies and depends on a number of factors, including but not limited to length of the target sequence, length of the primers, the cation concentrations, and/or the GC percentage.

The thermal cycler system of the present invention provides rapid temperature change for the PCR assay. For example, referring to panels (A) and (B) of FIG. 1 and panel (B) of FIG. 2, in some embodiments, the sample 90 (e.g. pre-mixed reaction medium) is added to one or both of the plates 10 and 20 in the open configuration and the plates is switched to the closed configuration to compress the sample 90 into a thin layer which has a thickness 102 that is regulated by a spacing mechanism (not shown); the radiation source 202 projects a electromagnetic wave 210 to the first plate 10 (e.g. specifically to the radiation absorbing layer 112); the radiation absorbing layer 112 is configured to absorb the electromagnetic wave 210 and convert at least a substantial portion of said electromagnetic wave 210 into heat, which increases the temperature of the sample; the removal of the electromagnetic wave 210 results in a temperature decrease in the sample 90.

In some embodiments, by projecting a electromagnetic wave 210 to the radiation absorbing layer 112 or increasing the intensity of the electromagnetic wave, the thermal cycler systems provide rapid heating (increase temperature) for any or all of the initialization step, the denaturation step and/or the extension/elongation step; in some embodiments, with the removal of the electromagnetic wave projected from the radiation source 202 or the decrease of the intensity of the electromagnetic wave, the cooling to the annealing step and/or the final cooling step is achieved with rapid speed. In some embodiments, the electromagnetic wave 210 or an increase of the intensity of the electromagnetic wave 210 creates an ascending temperature ramp rate of at least 50° C./s, 45° C./s, 40° C./s, 35° C./s, 30° C./s, 25° C./s, 20° C./s, 18° C./s, 16° C./s, 14° C./s, 12° C./s, 10° C./s, 9° C./s, 8° C./s, 7° C./s, 6° C./s, 5° C./s, 4° C./s, 3° C./s, or 2° C./s, or in a range between any of the two values. In certain embodiments, the average ascending temperature ramp rate in a PCR assay is 10° C./s or more. In some embodiments, the removal of the electromagnetic wave 210 or a reduction of the intensity of the electromagnetic wave 210 results in a descending temperature ramp rate of at least 50° C./s, 45° C./s, 40° C./s, 35° C./s, 30° C./s, 25° C./s, 20° C./s, 18° C./s, 16° C./s, 14° C./s, 12° C./s, 10° C./s, 9° C./s, 8° C./s, 7° C./s, 6° C./s, 5° C./s, 4° C./s, 3° C./s, or 2° C./s, or in a range between any of the two values. In certain embodiments, the average descending temperature ramp rate in a PCR assay is 5° C./s or more. As used here, the term “ramp rate” refers to the speed of temperature change between two pre-set temperatures. In some embodiments, the average ascending or descending temperature to each step is different.

During a PCR, within any step after the target temperature has been reached, the sample needs to be maintained at the target temperature for a certain period of time. The thermal cycler system of the present invention provides the temperature maintenance function by (1) adjusting the intensity of the electromagnetic wave 210, lowering it if the temperature has been raised to the target or increasing it if the temperature has been decreased to the target, and/or (2) keep the target temperature by balancing the heat provided to the sample and the heat removed from the sample.

Figure 3:
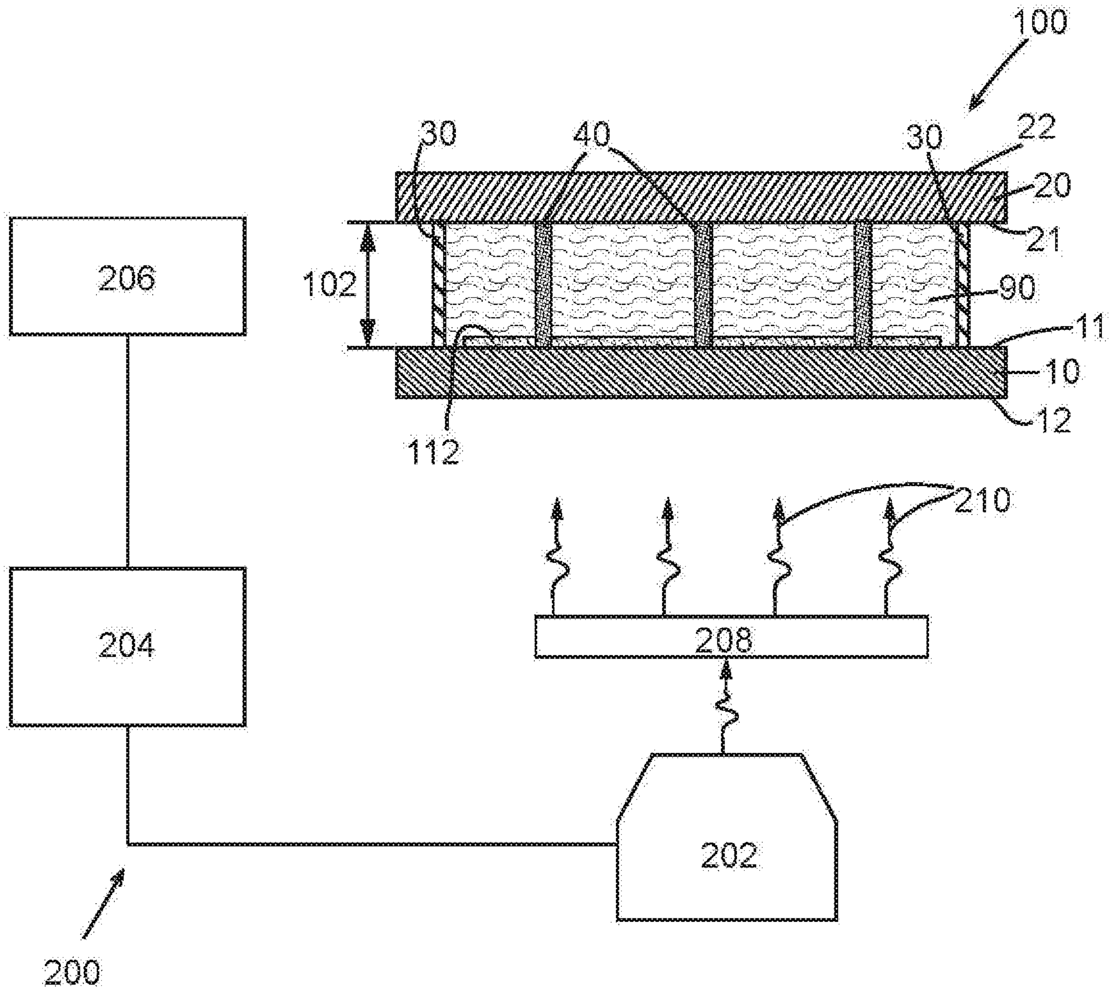
FIG. 3 shows a sectional view of an embodiment of the system of the present invention, demonstrating the system and showing additional elements that facilitate temperature change and control.

FIG. 3 shows a sectional view of an embodiment of the present invention, demonstrating the thermal cycler system and showing additional elements that facilitates temperature change and control. As shown in FIG. 2, the thermal cycler system comprises a sample unit 100 and a thermal control unit 200. The sample unit 100 comprises a first plate 10, a second plate 20, a spacing mechanism 40, and a sealing element 30; the thermal control unit 200 comprises a radiation source 202, a controller 204, a thermometer 206, and an expander 208.

FIG. 3 shows the sample unit 100 in a closed configuration, in which the inner surfaces 11 and 21 of the first and second plates 10 and 20 face each other and the spacing 102 between the two plates are regulated by a spacing mechanism 40. If a sample 90 has been deposited on one or both of the plates in the open configuration, when switching to the closed configuration, the first plate 10 and the second plate 20 are pressed by a human hand or other mechanisms, the sample 90 is thus compressed by the two plates into a thin layer. In some embodiments, the thickness of the layer is uniform and the same as the spacing 102 between the two plates. In certain embodiments, the spacing 102 (and thus the thickness of the sample layer) is regulated by the spacing mechanism 40. In some embodiments, the spacing mechanism comprises an enclosed spacer that is fixed to one of the plates. In some embodiments, the spacing mechanism 40 comprises a plurality of pillar shaped spacers that are fixed to one or both of the plates. Here the term “fixed” means that the spacer(s) is attached to a plate and the attachment is maintained during at least a use of the plate.

In some embodiments, the sample unit 10 is a compressed regulated open flow (CROF, also known as QMAX) device, such as but not limited to the CROF device described in U.S. Provisional Patent Application No. 62/202,989, which was filed on Aug. 10, 2015, U.S. Provisional Patent Application No. 62/218,455, which was filed on Sep. 14, 2015, U.S. Provisional Patent Application No. 62/293,188, which was filed on Feb. 9, 2016, U.S. Provisional Patent Application No. 62/305,123, which was filed on Mar. 8, 2016, U.S. Provisional Patent Application No. 62/369,181, which was filed on Jul. 31, 2016, U.S. Provisional Patent Application No. 62/394,753, which was filed on Sep. 15, 2016, PCT Application (designating U.S.) No. PCT/US2016/045437, which was filed on Aug. 10, 2016, PCT Application (designating U.S.) No. PCT/US2016/051775, which was filed on Sep. 14, 2016, PCT Application (designating U.S.) No. PCT/US2016/051794, which was filed on Sep. 15, 2016, and PCT Application (designating U.S.) No. PCT/US2016/054025, which was filed on Sep. 27, 2016, the complete disclosures of which are hereby incorporated by reference for all purposes.

In some embodiments, the sample unit 100 comprises a sealing element 30 that is configured to seal the spacing 102 between the first plate 10 and second plate 20 outside the medium contact area at the closed configuration. In certain embodiments, the sealing element 30 encloses the sample 90 within a certain area (e.g. the sample receiving area) so that the overall lateral area of the sample 90 is well defined and measurable. In certain embodiments, the sealing element 30 improves the uniformity of the sample 90, especially the thickness of the sample layer.

In some embodiments, the sealing element 30 comprises an adhesive applied between the first plate 10 and second plate 20 at the closed configuration. The adhesive is selective from materials such as but not limited to: starch, dextrin, gelatine, asphalt, bitumin, polyisoprenenatural rubber, resin, shellac, cellulose and its derivatives, vinyl derivatives, acrylic derivatives, reactive acrylic bases, polychloroprene, styrene-butadiene, styrene-diene-styrene, polyisobutylene, acrylonitrile-butadiene, polyurethane, polysulfide, silicone, aldehyde condensation resins, epoxide resins, amine base resins, polyester resins, polyolefin polymers, soluble silicates, phosphate cements, or any other adhesive material, or any combination thereof. In some embodiments, the adhesive is drying adhesive, pressure-sensitive adhesive, contact adhesive, hot adhesive, or one-part or multi-part reactive adhesive, or any combination thereof. In some embodiments, the glue is natural adhesive or synthetic adhesive, or from any other origin, or any combination thereof. In some embodiments, the adhesive is spontaneous-cured, heat-cured, UV-cured, or cured by any other treatment, or any combination thereof.

In some embodiments, the sealing element 30 comprises an enclosed spacer (well). For example, the enclosed spacer has a circular shape (or any other enclosed shape) from a top view and encircle the sample 90, essentially restricting the sample 90 together with the first plate 10 and the second plate 20. In certain embodiments, the enclosed spacer (well) also function as the spacing mechanism 40. In such embodiments, the enclosed spacer seals the lateral boundary of the sample 90 as well as regulate the thickness of the sample layer.

In some embodiments, the controller 204 is configured to adjust the temperature of the sample to facilitate an assay and/or reaction involving the sample 90 according to a pre-determined program. In some embodiments, the assay and/or reaction is a PCR. In certain embodiments, the controller 204 is configured to control the presence, intensity, and/or frequency of the electromagnetic wave from the radiation source 206.

As shown in FIG. 3, in some embodiments the thermal control unit 200 comprises a thermometer 206. In some embodiments, the thermometer 206 provides a monitoring and/or feedback mechanism to control/monitor/adjust the temperature of the sample 90. For example, in some embodiments the thermometer 206 is configured to measure the temperature at or in proximity of the sample contact area. In certain embodiments, the thermometer 206 is configured to directly measure the temperature of the sample 90. In some embodiments, the thermometer 206 is selected from the group consisting of: fiber optical thermometer, infrared thermometer, fluidic crystal thermometer, pyrometer, quartz thermometer, silicon bandgap temperature sensor, temperature strip, thermistor, and thermocouple. In certain embodiments, the thermometer 206 is an infrared thermometer.

In some embodiments, the thermometer 206 is configured to send signals to the controller 204. Such signals comprise information related to the temperature of the sample 90 so that the controller 204 makes corresponding changes. For example, during a PCR, for the denaturation step the target temperature is set for 95° C.; after measurement, the thermometer sends a signal to the controller 204, indicating that the measured temperature of the sample 90 is actually 94.8° C.; the controller 204 thus alters the output the radiation source 202, which projects a electromagnetic wave or adjust particular parameters (e.g. intensity or frequency) of an existing electromagnetic wave so that the temperature of the sample 90 is increased to 95° C. Such measurement-signaling-adjustment loop is applied to any step in any reaction/assay.

As shown in FIG. 3, the thermal control unit 200 comprises a beam expander 208, which is configured to expand the electromagnetic wave from the radiation source 202 from a smaller diameter to a larger diameter. In some embodiments, the electromagnetic wave projected from the radiation source 202 is sufficient to cover the entire sample contact area; in some embodiments however, it is necessary to expand the covered area of the electromagnetic wave projected directed from the radiation source 202 to produce an expanded electromagnetic wave 210, providing a heat source for all the sample contact area(s). The beam expander 208 employs any known technology, including but not limited to the bean expanders described in U.S. Pat. Nos. 4,545,677, 4,214,813, 4,127,828, and 4,016,504, and U.S. Pat. Pub. No. 2008/0297912 and 2010/0214659, which are incorporated by reference in their entireties for all purposes.

Multiplexing

Figure 4:
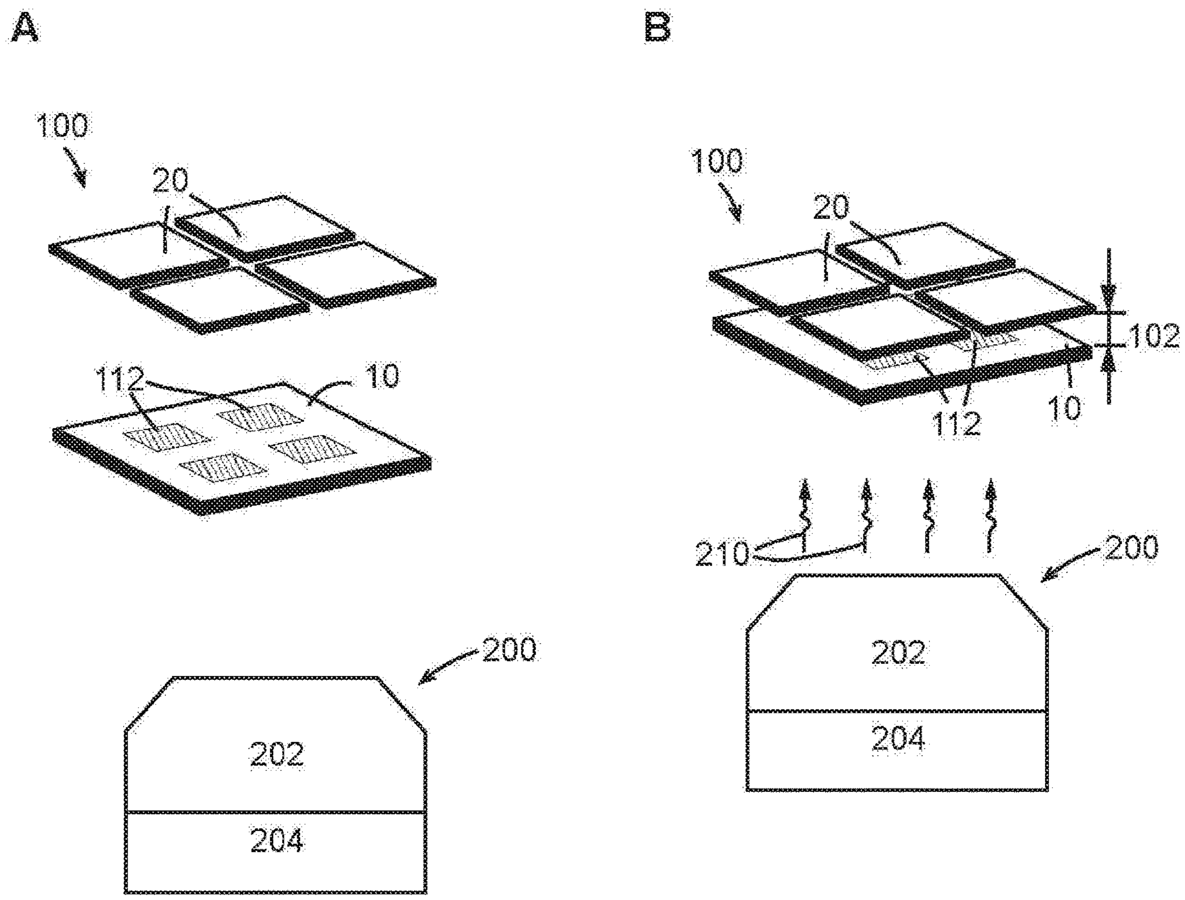
FIG. 4A shows a perspective view of another embodiment of the present invention, illustrating the sample unit in an open configuration, in which the first plate and the second plates are partially or entirely separated apart, allowing the deposition of one or more samples on one or both of the plates according to one embodiment of the present disclosure.
FIG. 4B shows a perspective view of another embodiment of the present invention, illustrating the sample unit in a closed configuration, in which the inner surfaces of the two plates face each other and the spacing between the two plates are regulated by the spacing mechanism according to one embodiment of the present invention.

FIG. 4 shows perspective views of another embodiment of the present invention, where there are multiple sample contact areas on the plates, allowing the processing and analysis of multiple samples. As shown in panels (A) and (B) of FIG. 3, the thermal cycler system of the present invention comprises a sample unit 100 and a thermal control unit 200; the sample unit 100 comprises a first plate 10, a plurality of second plates 20, and a plurality of spacing mechanisms (not shown); the thermal control unit 200 comprises a radiation source 202 and a controller 204.

Referring to panel (A) of FIG. 4, one or both of the plates (e.g. the first plate 10) comprises a plurality of sample contact areas (not marked). In some embodiments, one or both of the plates (e.g. the first plate 10) comprises a plurality of radiation absorbing layers 112. Panel (A) of FIG. 4 shows the sample unit 100 in an open configuration, in which the first plate 10 and the second plates 20 are partially or entirely separated apart, allowing the deposition of one or more samples on one or both of the plates. In the open configuration, the spacing between the first plate 10 and the second plates 20 are not regulated by the spacing mechanisms.

Panel (B) of FIG. 4 shows the sample unit 100 in a closed configuration, in which the inner surfaces of the two plates face each other and the spacing 102 between the two plates are regulated by the spacing mechanism (not shown). If one or more samples have been deposited on the plates, the plates are configured to compress each sample into a layer, the thickness of the layer is regulated by the spacing mechanism.

As shown in panel (B) of FIG. 4, a plurality of second plates 20 is used to cover part of the first plate 10. For example, each second plate 20 covers a single sample contact area, onto which a sample is deposited. A spacing mechanism is present for each sample contact area and the spacing mechanisms have different heights, resulting in different spacing 102 for each sample contact area and for different thickness for each sample layer. For example, the spacing mechanism is pillar shaped spacers; each sample contact area has a set of spacers having a uniform height; different sets of spacers have the same or different heights, resulting in same or different sample layer thickness for the different samples.

Referring to panels (A) and (B) of FIG. 4, in some embodiments, the controller 204 directs the radiation source 202 to project a electromagnetic wave 210 to the first plate 10 (and thus the radiation absorbing layer 112), where the electromagnetic wave 210 is absorbed by the radiation absorbing layer 112 and converted to heat, resulting in change of temperature in the samples. In some embodiments, when there are multiple sample contact areas, multiple samples are processed and analyzed. For example, in certain embodiments each of the sample is a pre-mixed PCR reaction medium having different components. One sample unit 100 is used to test different conditions for amplifying the same nucleotide and/or amplifying different nucleotides with the same or different conditions.

Exemplary Embodiments

Figure 5:
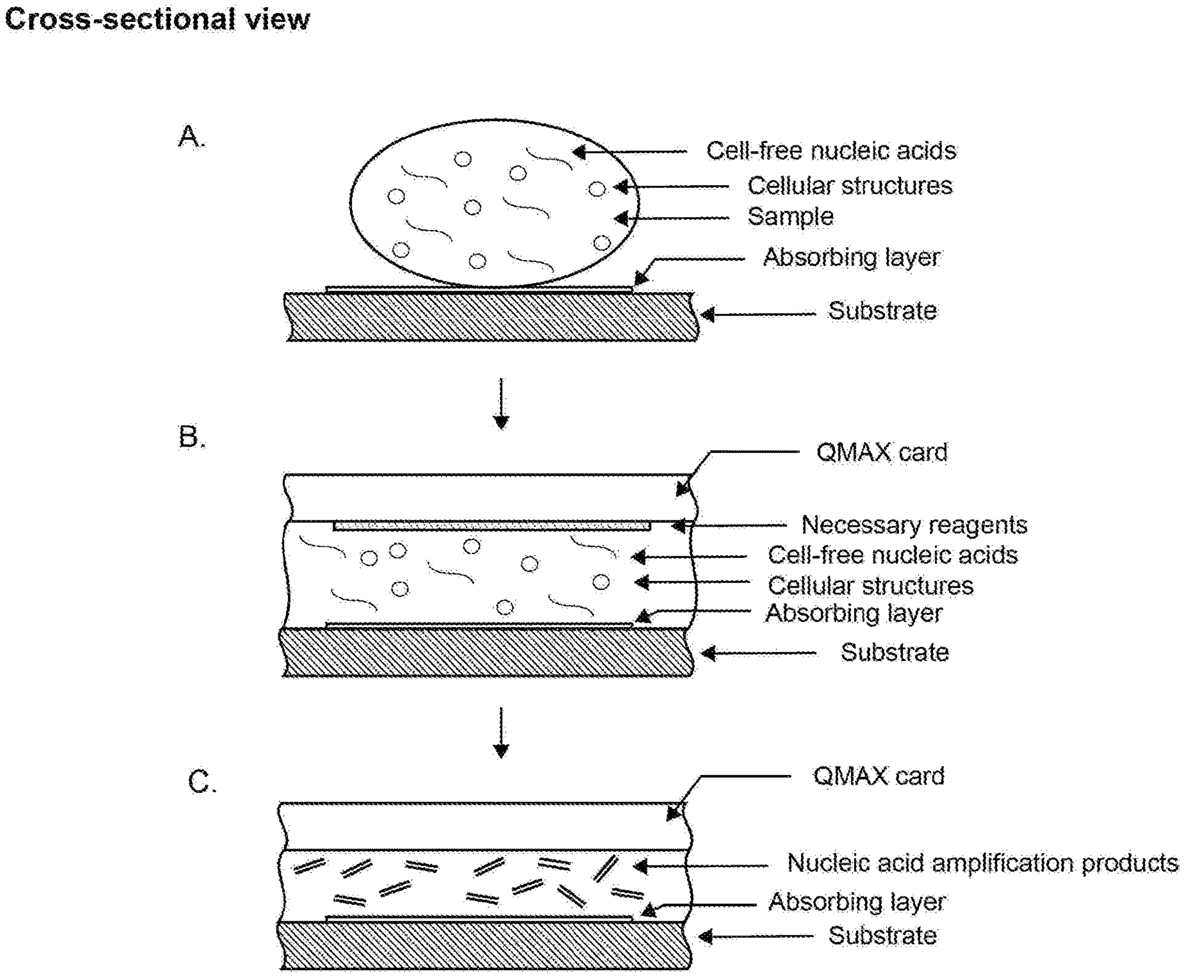
FIG. 5A shows a sectional view of an embodiment of the present invention, illustrating a step of how the sample is added and compressed according to one embodiment of the present disclosure.
FIG. 5B shows a sectional view of an embodiment of the present invention, illustrating another step of how the sample is added and compressed according to one embodiment of the present disclosure.
FIG. 5C shows a sectional view of an embodiment of the present invention, illustrating yet another step of how the sample is added and compressed according to one embodiment of the present disclosure.

FIG. 5 illustrates a cross-sectional view of an exemplary procedure for nucleic acid amplification using a QMAX card device. Examples of steps include (a) introducing sample containing nucleic acids onto the inner side of a first plate (substrate); (b) pressing a second plate (QMAX card) onto the inner surface of the first plate to form a closed configuration of the device, where necessary reagents for nucleic acid amplification are dried on the inner surface of the second plate; (c) accumulating nucleic acid amplification products in the chamber enclosed by the first and the second plates.

FIG. 5 illustrates a cross-sectional view of an exemplary procedure for nucleic acid amplification using a QMAX card device.

More particularly, in step (a), the "sample" can be any nucleic acid containing or not containing samples, including but not limited to human bodily fluids, such as whole blood, plasma, serum, urine, saliva, and sweat, and cell cultures (mammalian, plant, bacteria, fungi). The sample can be freshly obtained, or stored or treated in any desired or convenient way, for example by dilution or adding buffers, or other solutions or solvents. Cellular structures can exist in the sample, such as human cells, animal cells, plant cells, bacteria cells, fungus cells, and virus particles.

The term "nucleic acid" as used herein refers to any DNA or RNA molecule, or a DNA/RNA hybrid, or mixtures of DNA and/or RNA. The term "nucleic acid" therefore is intended to include but not limited to genomic or chromosomal DNA, plasmid DNA, amplified DNA, cDNA, total RNA, mRNA and small RNA. The term "nucleic acid" is also intended to include natural DNA and/or RNA molecule, or synthetic DNA and/or RNA molecule. In some embodiments, cell-free nucleic acids are presence in the sample, as used herein "cell-free" indicates nucleic acids are not contained in any cellular structures. In some other embodiments, nucleic acids are contained within cellular structures, which include but not limited to human cells, animal cells, plant cells, bacterial cells, fungi cells, and/or viral particles. Nucleic acids either in the form of cell-free nucleic acids or within cellular structures or a combination thereof, can be presence in the sample. In some further embodiments, nucleic acids are purified before introduced onto the inner surface of the first plate. In yet further embodiments, nucleic acids can be within a complex associated with other molecules, such as proteins and lipids.

The method of the invention is suitable for samples of a range of volumes. Sample having different volumes can be introduced onto the plates having different dimensions.

The sample can be introduced onto either the first plate or the second plate, or even both when necessary. FIG. 5. herein provides an example of introducing sample onto the first plate inner surface.

More particularly, in step (b), a second plate is pressed onto the inner surface of the first plate, in contact with the sample, to form a closed configuration of the device. As used herein, "a second plate" refers to a QMAX card with periodic spacers on the inner surface contacting samples.

As used herein, "nucleic acid amplification" includes any techniques used to detect nucleic acids by amplifying (generating numerous copies of) the target molecules in samples, herein "target" refers to a sequence, or partial sequence, of nucleic acid of interest. Suitable nucleic acid amplification techniques include but not limited to, different polymerase chain reaction (PCR) methods, such as hot-start PCR, nested PCR, touchdown PCR, reverse transcription PCR, RACE PCR, digital PCR, etc., and isothermal amplification methods, such as Loop-mediated isothermal amplification, strand displacement amplification, helicase-dependent amplification, nicking enzyme amplification, rolling circle amplification, recombinase polymerase amplification, etc.

As used herein, "necessary reagents" include but not limited to, primers, deoxynucleotides (dNTPs), bivalent cations (e.g. $Mg^{2+}$), monovalent cation (e.g. $K^{+}$), buffer solutions, enzymes, and reporters. Necessary reagents for nucleic acid amplification can be either in the dry form on the inner surface of the first or the second plate or both, or in a liquid form encased in, embedded in, or surrounded by, a material that melts with increasing temperatures, such as, for example, paraffin.

As used herein, "primers", in some embodiments, can refer to a pair of forward and reverse primers. In some embodiments, primers can refer to a plurality of primers or primer sets. As used herein, enzymes suitable for nucleic acid amplification include, but not limited to, DNA-dependent polymerase, or RNA-dependent DNA polymerase, or DNA-dependent RNA polymerase.

As used herein, the term "reporter" refers to any tag, label, or dye that can bind to, or intercalate within, the nucleic acid molecule or be activated by byproducts of the amplification process to enable visualization of the nucleic acid molecule or the amplification process. Suitable reporters include but are not limited to fluorescent labels or tags or dyes, intercalating agents, molecular beacon labels, or bioluminescent molecules, or a combination thereof.

In some other embodiments, as used herein, "necessary reagents" can also include cell lysing reagent, which facilitates to break down cellular structures. Cell lysing reagents include but not limited to salts, detergents, enzymes, and other additives. The term "salts" herein include but not limited to lithium salt (e.g. lithium chloride), sodium salt (e.g. sodium chloride), potassium (e.g. potassium chloride). The term "detergents" herein can be ionic, including anionic and cationic, non-ionic or zwitterionic. The term "ionic detergent" as used herein includes any detergent which is partly or wholly in ionic form when dissolved in water. Suitable anionic detergents include but not limited to sodium dodecyl sulphate (SDS) or other alkali metal alkylsulphate salts or similar detergents, sarkosyl, or combinations thereof. The term "enzymes" herein include but not limited to lysozyme, cellulase, and proteinase. In addition, chelating agents including but not limited to EDTA, EGTA and other polyamino carboxylic acids, and some reducing agents, such as dithiotreitol (dTT), can also be included in cell lysing reagents. The compositions of necessary reagents herein vary according to rational designs of different amplification reactions.

More particularly, in step (c), when the device is in the closed configuration, a radiation source projects an electromagnetic wave to the radiation absorbing layer on the inner or outer surface of the first plate, or the second plate or both. The radiation absorbing layer is configured to absorb the electromagnetic wave and convert at least a substantial portion of the energy from the said electromagnetic wave into the form of heat, which transmitted to the sample in the closed chamber. In some embodiments, the radiation source is programmed to adjust the temperature of the said sample in a range from ambient temperature to 98° C. In some embodiments, for example for conventional PCR, the sample is first heated to 98° C., and then undergoes a repeated cycle of 94° C., 50-65° C., and 72° C. for 15-40 times. In some embodiments, for example for isothermal amplification, the temperature of the sample is maintained at a constant temperature.

As used herein, "nucleic acid amplification product" refers to various nucleic acids generated by nucleic acid amplification techniques. Types of nucleic acid amplification products herein include but not limited to single strand DNA, single strand RNA, double strand DNA, linear DNA, or circular DNA, etc. In some embodiments, nucleic acid amplification product can be identical nucleic acids having the same length and configuration. In some other embodiments, nucleic acid amplification products can be a plurality of nucleic acids having different lengths and configurations.

In some embodiments, nucleic acids accumulated after nucleic acid amplification is quantified using reporters. As defined and used above, reporter having quantifiable features that is correlated with the presence or the absence, or the amount of the nucleic acid amplicons accumulated in the closed chamber.

Figure 6:
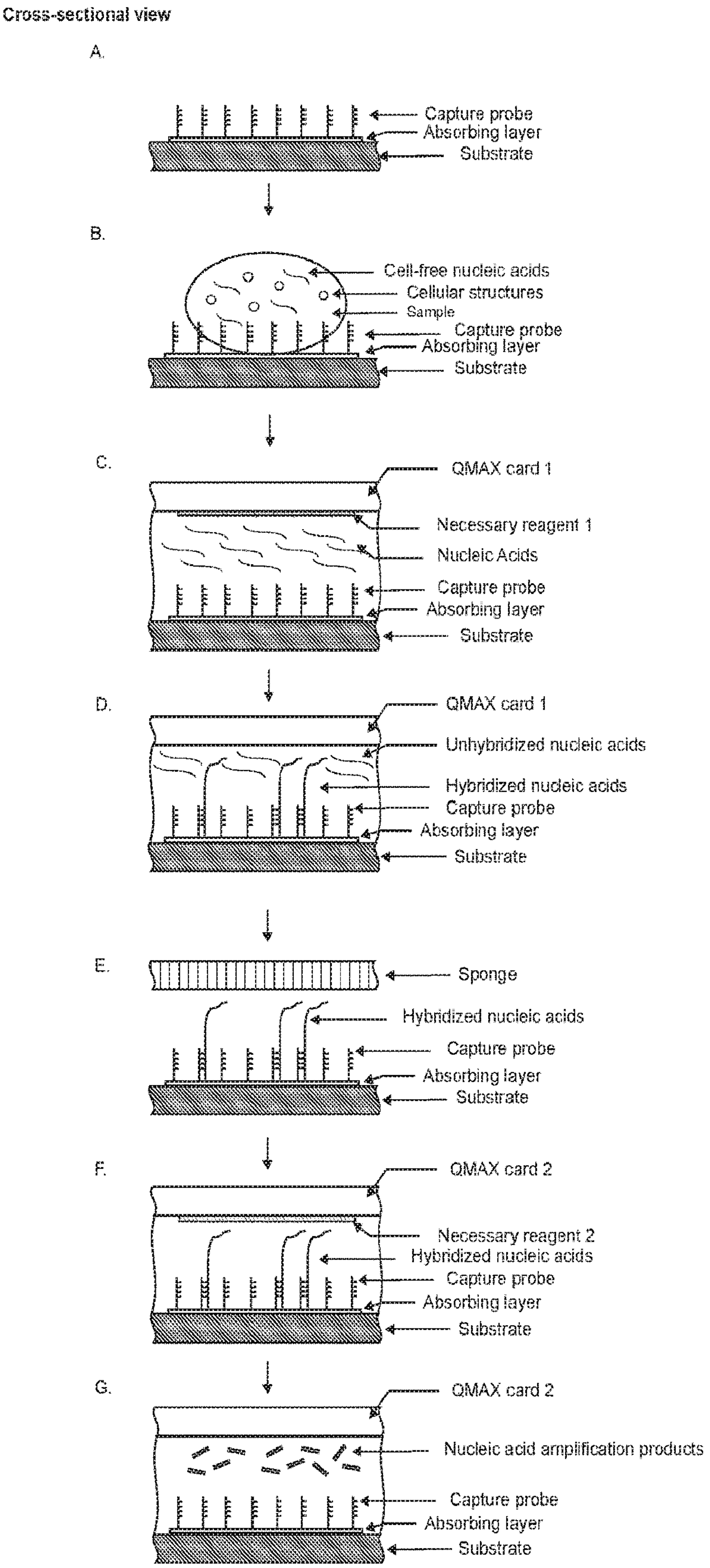
FIG. 6A shows a sectional view of an embodiment of the present invention, illustrating a step of the PCR process according to one embodiment of the present disclosure.
FIG. 6B shows a sectional view of an embodiment of the present invention, illustrating another step of the PCR process according to one embodiment of the present disclosure.
FIG. 6C shows a sectional view of an embodiment of the present invention, illustrating yet another step of the PCR process according to one embodiment of the present disclosure.
FIG. 6D shows a sectional view of an embodiment of the present invention, illustrating yet another step of the PCR process according to one embodiment of the present disclosure.
FIG. 6E shows a sectional view of an embodiment of the present invention, illustrating yet another step of the PCR process according to one embodiment of the present disclosure.
FIG. 6F shows a sectional view of an embodiment of the present invention, illustrating yet another step of the PCR process according to one embodiment of the present disclosure.
FIG. 6G shows a sectional view of an embodiment of the present invention, illustrating yet another step of the PCR process according to one embodiment of the present disclosure.

FIG. 6 illustrates a cross-sectional view of an exemplary assay procedure combining nucleic acid extraction and amplification using a QMAX card device. Examples of steps include (a) immobilizing capture probes on the inner surface of a first plate (substrate); (b) introducing samples onto the inner surface of the first plate; (c) pressing a second plate (QMAX card 1) onto the inner surface of the first plate to form a closed configuration of the device, where necessary reagents 1 to facilitate releasing and capturing nucleic acids are dried on the inner surface of the second plate; (d) capturing nucleic acids from the above said sample onto the inner surface of the first plate; (e) detaching the second plate and cleaning the inner surface of the first plate using sponge; (f) pressing a third plate (QMAX card 2) onto the inner surface of the first plate, where necessary reagents 2 for nucleic acid amplification are dried on the inner surface of the third plate; (g) accumulating nucleic acid amplification products in the chamber enclosed by the first and the third plate.

More particular, in step (a), capture probes are immobilized on the inner surface of the first plate. As used herein, "capture probes" refer to oligonucleotides having the length between 1-200 bp, preferably between 5-50 bp, more preferably between 10-20 bp. Capture probes have complementary sequence to nucleic acid sequences of interest in the sample. In some embodiments, identical capture probes are immobilized on the surface of the first plate. In some other embodiments, different capture probes having different base pair compositions are immobilized on the surface of the first plate. Capture probes can be DNA, or RNA, or both, but preferably to be single strand DNA. As used herein, "immobilize" refers to a process to anchor the capture probe on the plate surface. In some embodiments, capture probes are anchored through covalent bond, wherein, for example, either 5' or 3' end of the capture probe is modified to facilitate coating on the plate surface. Commonly used 3' end modifications include but not limited to thiol, dithiol, amine, biotin, etc. In some other embodiments, capture probes can be passively absorbed on the substrate surface.

After immobilized with capture probes, the plate surface is blocked with blocker solutions. Suitable blockers include but not limited to 6-Mercapto-hexanol, bovine serum albumin, etc.

As shown in step (b) in FIG. 6., the "sample" can be any nucleic acid containing or not containing samples, including but not limited to human bodily fluids, such as whole blood, plasma, serum, urine, saliva, and sweat, and cell cultures (mammalian, plant, bacteria, fungi). The sample can be freshly obtained, or stored or treated in any desired or convenient way, for example by dilution or adding buffers, or other solutions or solvents. Cellular structures can exist in the sample, such as human cells, animal cells, plant cells, bacteria cells, fungus cells, and virus particles.

The term "nucleic acid" as used herein refers to any DNA or RNA molecule, or a DNA/RNA hybrid, or mixtures of DNA and/or RNA. The term "nucleic acid" therefore is intended to include but not limited to genomic or chromosomal DNA, plasmid DNA, amplified DNA, cDNA, total RNA, mRNA and small RNA. The term "nucleic acid" is also intended to include natural DNA and/or RNA molecule, or synthetic DNA and/or RNA molecule. In some embodiments, cell-free nucleic acids are presence in the sample, as used herein "cell-free" indicates nucleic acids are not contained in any cellular structures. In some other embodiments, nucleic acids are contained within cellular structures, which include but not limited to human cells, animal cells, plant cells, bacterial cells, fungi cells, and/or viral particles. Nucleic acids either in the form of cell-free nucleic acids or within cellular structures or a combination thereof, can be presence in the sample. In some further embodiments, nucleic acids are purified before introduced onto the inner surface of the first plate. In yet further embodiments, nucleic acids can be within a complex associated with other molecules, such as proteins and lipids.

The method of the invention is suitable for samples of a range of volumes. Sample having different volumes can be introduced onto the plates having different dimensions.

The sample can be introduced onto either the first plate or the second plate, or even both when necessary. FIG. 6 herein provides an example of introducing sample onto the first plate inner surface.

More particularly, in step (c), a second plate (QMAX card 1) is pressed onto the inner surface of the first plate (substrate), in contact with the sample, to form a closed configuration of the device. Necessary reagents 1 for nucleic acid amplification can be either in the dry form on the inner surface of the first or the second plate or both, or in a liquid form encased in, embedded in, or surrounded by, a material that melts with increasing temperatures, such as, for example, paraffin.

As used herein, "necessary reagent 1" refer to cell lysing reagent, or hybridization reagents, or a combination thereof.

As used herein, "cell lysing reagents", intend to include but not limited to salts, detergents, enzymes, and other additives, which facilitates to disrupt cellular structures. The term "salts" herein include but not limited to lithium salt (e.g. lithium chloride), sodium salt (e.g. sodium chloride), potassium (e.g. potassium chloride). The term "detergents" herein can be ionic, including anionic and cationic, non-ionic or zwitterionic. The term "ionic detergent" as used herein includes any detergent which is partly or wholly in ionic form when dissolved in water. Suitable anionic detergents include but not limited to sodium dodecyl sulphate (SDS) or other alkali metal alkylsulphate salts or similar detergents, sarkosyl, or combinations thereof. The term "enzymes" herein include but not limited to lysozyme, cellulase, and proteinase. In addition, chelating agents including but not limited to EDTA, EGTA and other polyamino carboxylic acids, and some reducing agents, such as dithiotreitol (dTT), can also be included in cell lysing reagents. The compositions of necessary reagents herein vary according to rational designs of different amplification reactions.

As used herein, "hybridization reagents" refer to reagents that facilitate the hybridization between immobilized capture probes and nucleic acid of interest in the sample, herein including but not limited to sodium chloride, sodium acetate, ficoll, dextran, polyvinylpyrrolidone, bovine serum albumin, etc.

More particularly, in step (d), after in contact with the above said sample, dried necessary reagent 1 dissolves in the sample. Nucleic acids of interest, either released from disrupted cellular structures or presence as cell-free nucleic acids, or a combination thereof, hybridize to the complementary capture probes on the plate surface. Time used for hybridization varies, largely depending on the specifications of the spacers on the inner surface of the QMAX card 1. In some embodiments, for example, when a QMAX card 1 having 30 um spacers in height is used, experimental data indicated after 2 min, hybridization between nucleic acids of interest and immobilized capture probes reached equilibrium. As used herein FIG. 6 (d), "unhybridized nucleic acids" refer to nucleic acids that are not captured by the immobilized capture probes. More particularly, in step (e), the second plate (QMAX card 1) is detached from the first plate (substrate) and the surface of the first plate (substrate) is cleaned using sponge. As used herein, "sponge" refers to a class of flexible porous materials that change pore sizes under different pressures. Sponges containing washing buffer are in contact with the first plate surface to remove contaminates. In some embodiments, sponges are in contact with the first plate surface for one time. In some other embodiments, sponges are in contact with the first plate surface for twice, or more than twice. As used herein, "contaminates" refer to compounds including but not limited to cell debris, proteins, non-specific nucleic acid, etc. that are detrimental to the nucleic acid amplification reaction.

More particularly, in step (f), a third plate (QMAX card 2) is pressed onto the inner surface of the first plate, in contact with the sample, to form a closed configuration of the device. Necessary reagent 2 for nucleic acid amplification can be either in the dry form on the inner surface of the first or the third plate or both, or in a liquid form encased in, embedded in, or surrounded by, a material that melts with increasing temperatures, such as, for example, paraffin.

As used herein, "nucleic acid amplification" includes any techniques used to detect nucleic acids by amplifying (generating numerous copies of) the target molecules in samples, herein "target" refers to a sequence, or partial sequence, of nucleic acid of interest. Suitable nucleic acid amplification techniques include but not limited to, different polymerase chain reaction (PCR) methods, such as hot-start PCR, nested PCR, touchdown PCR, reverse transcription PCR, RACE PCR, digital PCR, etc., and isothermal amplification methods, such as Loop-mediated isothermal amplification, strand displacement amplification, helicase-dependent amplification, nicking enzyme amplification, rolling circle amplification, recombinase polymerase amplification, etc.

As used herein, "necessary reagent 2" include but not limited to, primers, deoxynucleotides (dNTPs), bivalent cations (e.g. Mg2+), monovalent cation (e.g. K+), buffer solutions, enzymes, and reporters. Necessary reagent 2 for nucleic acid amplification can be either in the dry form on the inner surface of the first or the second plate or both, or in a liquid form encased in, embedded in, or surrounded by, a material that melts with increasing temperatures, such as, for example, paraffin.

As used herein, "primers", in some embodiments, can refer to a pair of forward and reverse primers. In some embodiments, primers can refer to a plurality of primers or primer sets. As used herein, enzymes suitable for nucleic acid amplification include, but not limited to, DNA-dependent polymerase, or RNA-dependent DNA polymerase, or DNA-dependent RNA polymerase.

As used herein, the term "reporter" refers to any tag, label, or dye that can bind to, or intercalate within, the nucleic acid molecule or be activated by byproducts of the amplification process to enable visualization of the nucleic acid molecule or the amplification process. Suitable reporters include but are not limited to fluorescent labels or tags or dyes, intercalating agents, molecular beacon labels, or bioluminescent molecules, or a combination thereof.

More particularly, in step (g), when the device is in the closed configuration, a radiation source projects an electromagnetic wave to the radiation absorbing layer on the inner or outer surface of the first plate, or the third plate or both. The radiation absorbing layer is configured to absorb the electromagnetic wave and convert at least a substantial portion of the energy from the said electromagnetic wave into the form of heat, which transmitted to the sample in the closed chamber. In some embodiments, the radiation source is programmed to adjust the temperature of the said sample in a range from ambient temperature to 98° C. In some embodiments, for example for conventional PCR, the sample is first heated to 98° C., and then undergoes a repeated cycle of 94° C., 50-65° C., and 72° C. for 15-40 times. In some embodiments, for example for isothermal amplification, the temperature of the sample is maintained at a constant temperature.

As used herein, "nucleic acid amplification product" refers to various nucleic acids generated by nucleic acid amplification techniques. Types of nucleic acid amplification products herein include but not limited to single strand DNA, single strand RNA, double strand DNA, linear DNA, or circular DNA, etc. In some embodiments, nucleic acid amplification product can be identical nucleic acids having the same length and configuration. In some other embodiments, nucleic acid amplification products can be a plurality of nucleic acids having different lengths and configurations.

In some embodiments, nucleic acids accumulated after nucleic acid amplification is quantified using reporters. As defined and used above, reporter having quantifiable features that is correlated with the presence or the absence, or the amount of the nucleic acid amplicons accumulated in the closed chamber.

Additional Exemplary Embodiments

In some embodiments, a device for rapidly changing temperature of a thin fluidic sample layer, comprising: a first plate, a second plate, and a radiation absorbing layer, wherein:

i. the radiation absorbing layer is on one of the plates, ii. each of the plates comprises, on its respective surface, a sample contact area for contacting a fluidic sample; and iii. the plates have a configuration for rapidly changing temperature of the sample, in which:

a. the sample contact areas face each other and are significant parallel, b. the average spacing between the contact areas is equal to or less than 200 microns, c. the two plates regulate (or confine) at least part of the sample into a layer of highly uniform thickness and substantially stagnant relative to the plates, d. the radiation absorbing layer is near the at least part of the sample of uniform thickness, e. the area of the at least part of the sample and the radiation absorbing layer are substantially larger than the uniform thickness.

A1-2. A device for rapidly changing temperature of a thin fluidic sample layer, comprising: a first plate, a second plate, and spacers, wherein:

i. The first plate and the second plate are movable relative to each other into different configurations;

ii. each of the plates comprises, on its respective surface, a sample contact area for contacting a fluidic sample, wherein the temperature of at least a part of the same needs to change rapidly;

iii. the plates have a configuration for rapidly changing temperature of the sample;

iv. the spacers have a predetermined substantially uniform height that is equal to or less than 200 microns;

v. at least one of the spacers is inside the sample contact area;

wherein one of the configurations is an open configuration, in which: the two plates are partially or completely separated apart, the spacing between the plates is not regulated by the spacers, and the sample is deposited on one or both of the plates; and wherein another of the configurations is a closed configuration which is configured after the sample is deposited in the open configuration; and in the closed configuration: at least a part of the sample is compressed by the two plates into a layer of substantially uniform thickness and is substantially stagnant relative to the plates, wherein the uniform thickness of the layer is confined by the sample contact areas of the two plates and is regulated by the plates and the spacers, and wherein the plates have a configuration for rapidly changing temperature of the sample.

B1. A system for rapidly changing temperature of a thin fluidic sample layer, comprising: a first plate, a second plate, a radiation absorbing layer, and a radiation source, wherein:

i. the radiation absorbing layer is on one of the plates;

ii. the radiation source is configured to radiate electromagnetic waves that the radiation absorbing layer absorbs significantly;

iii. each of the plates comprises, on its respective surface, a sample contact area for contacting a fluidic sample; and iv. the plates have a configuration for rapidly changing temperature of the sample, in which:

a. the sample contact areas face each other and are significant parallel, b. the average spacing between the contact areas is equal to or less than 200 μm, c. the two plates confine at least part of the sample into a layer of highly uniform thickness and substantially stagnant relative to the plates, d. the radiation absorbing layer is near the at least part of the sample of uniform thickness, e. the area of the at least part of the sample and the radiation absorbing layer are substantially larger than the uniform thickness.

C1. A system for facilitating a polymerase chain reaction (PCR) by rapidly changing temperature of a thin fluidic PCR sample layer, comprising: a first plate, a second plate, a radiation absorbing layer, a radiation source, and a controller wherein:

i. the radiation absorbing layer is on one of the plates;

ii. the radiation source is configured to radiate electromagnetic waves that the radiation absorbing layer absorbs significantly;

iii. each of the plates comprises, on its respective surface, a sample contact area for contacting a fluid PCR sample, which is a pre-mixed PCR medium;

iv. the controller is configured to control the radiation source and rapidly change the temperature of the sample according to a predetermined program; and v. the plates have a configuration for rapidly changing temperature of the sample, in which:

(a) the sample contact areas face each other and are significant parallel, (b) the average spacing between the contact areas is equal to or less than 200 μm, (c) the two plates confine at least part of the sample into a layer of highly uniform thickness and substantially stagnant relative to the plates, (d) the radiation absorbing layer is near the at least part of the sample of uniform thickness, and (e) the area of the at least part of the sample and the radiation absorbing layer are substantially larger than the uniform thickness.

D1. A method for rapidly changing temperature of a thin fluidic sample layer, comprising:

i. providing a first plate a second plate, each of the plates comprising, on its respective inner surface, a sample contact area;

ii. providing a radiation absorbing layer and a radiation source, wherein the radiation absorbing layer is on one of the plates, and the radiation source is configured to radiate electromagnetic waves that the radiation absorbing layer absorbs significantly;

iii. depositing a fluidic sample on one or both of the plates;

iv. pressing the plates into a closed configuration, in which:

(a) the sample contact areas face each other and are significant parallel, (b) the average spacing between the contact areas is equal to or less than 200 μm, (c) the two plates confine at least part of the sample into a layer of highly uniform thickness and substantially stagnant relative to the plates;

(d) the radiation absorbing layer is near the at least part of the sample of uniform thickness, (e) the area of the at least part of the sample and the radiation absorbing layer are substantially larger than the uniform thickness; and v. changing and maintaining the temperature of the sample layer by changing the presence, intensity, wavelength, frequency, and/or angle of the electromagnetic waves from the radiation source.

E1. A method for facilitating a polymerase chain reaction (PCR) by rapidly changing temperatures in a fluidic PCR sample, comprising:

i. providing a first plate a second plate, each of the plates comprising, on its respective inner surface, a sample contact area;

ii. providing a radiation absorbing layer, a radiation source and a controller, wherein the radiation absorbing layer is on one of the plates, and the radiation source is configured to radiate electromagnetic waves that the radiation absorbing layer absorbs significantly;

iii. depositing a fluidic PCR sample on one or both of the plates;

iv. pressing the plates into a closed configuration, in which:

(a) the sample contact areas face each other and are significant parallel, (b) the average spacing between the contact areas is equal to or less than 200 μm, (c) the two plates confine at least part of the PCR sample into a layer of highly uniform thickness and substantially stagnant relative to the plates;

(d) the radiation absorbing layer is near the at least part of the PCR sample of uniform thickness, (e) the area of the at least part of the sample and the radiation absorbing layer are substantially larger than the uniform thickness; and v. using the controller to control the radiation source to conduct a PCR by changing and maintaining the temperature of the PCR sample layer according to a predetermined program, wherein when the temperatures are changed, the radiation source creates an average ascending temperature rate ramp of at least 10° C./s and an average descending temperature rate ramp of at least 5° C./s during the PCR.

E2. The method of embodiment E1, wherein changing and maintaining the temperature of the PCR sample layer is achieved by adjusting the intensity, wavelength, frequency, and/or angle of the electromagnetic waves from the radiation source.

In some embodiments, a device for rapidly changing temperature of a thin fluidic sample layer, comprising: a first plate, a second plate, and spacers, wherein:

iv. The first plate and the second plate are movable relative to each other into different configurations, including an open configuration and a closed configuration;

v. each of the plates comprises, on its respective surface, a sample contact area for contacting a fluidic sample, wherein the temperature of at least a part of the same needs to change rapidly;

vi. the plates have a configuration for rapidly changing temperature of the sample;

vii. the spacers have a predetermined substantially uniform height that is equal to or less than 200 microns;

viii. at least one of the spacers is inside the sample contact area;

wherein in an open configuration, the two plates are partially or completely separated apart, the spacing between the plates is not regulated by the spacers, and the sample is deposited on one or both of the plates; and wherein in a closed configuration, which is configured after the sample is deposited in the open configuration, the two plate are substantially parallel, at least a part of the sample is compressed by the two plates into a layer of substantially uniform thickness and is substantially stagnant relative to the plates, wherein the uniform thickness of the layer is confined by the sample contact areas of the two plates and is regulated by the plates and the spacers, and wherein the plates are configured to change the temperature of the sample at a rate of at least 10° C./sec.

In some embodiments, the device of any prior embodiments, further comprising a radiation absorbing lay near the at least part of the sample of uniform thickness, whereas the area of the at least part of the sample and the radiation absorbing layer are substantially larger than the uniform thickness.

In some embodiments, a system for rapidly changing temperature of a thin fluidic sample layer, comprising:

i. a device of any prior embodiments, ii. a radiation source, wherein the radiation source is configured to radiate electromagnetic waves that the radiation absorbing layer absorbs significantly; and iii. the controller is configured to control the radiation source and rapidly change the temperature of the sample.

In some embodiments, a method for rapidly changing temperature of a thin fluidic sample layer, comprising:

i. providing a device or a system of any prior embodiments;

ii. depositing a fluid sample on one or both of the plates;

iii. pressing the plates into a closed configuration; and iv. changing and maintaining the temperature of the sample layer by changing the presence, intensity, wavelength, frequency, and/or angle of the electromagnetic waves from the radiation source.

In some embodiments, the device, system, or method of any prior embodiments, wherein the changing temperature of the sample is a thermal cycling that changes the temperature up and down in cyclic fashion.

In some embodiments, the device, system, or method of any prior embodiments, wherein the changing temperature of the sample is a thermal cycling, wherein the thermal cycling is for amplification of nucleic acid using polymerase chain action (PCR).

In some embodiments, the device, system, or method of any prior embodiments, wherein the changing of the temperature of the sample is for isothermal amplification of nucleic acid.

In some embodiments, the device, system, or method of any prior embodiments, the area of the at least part of the sample and the radiation absorbing layer are substantially larger than the uniform thickness.

In some embodiments, The device, system, or method of any prior embodiments, wherein the radiation absorbing layer comprises a disk-coupled dots-on-pillar antenna (D2PA) array, silicon sandwich, graphene, superlattice or other plasmonic materials, other a combination thereof.

In some embodiments, the device, system, or method of any prior embodiments, wherein the radiation absorbing layer comprises carbon or black nanostructures or a combination thereof.

In some embodiments, he device, system, or method of any prior embodiments, wherein the radiation absorbing layer is configured to absorb radiation energy.

In some embodiments, the device, system, or method of any prior embodiments, wherein the radiation absorbing layer is configured to radiate energy in the form of heat after absorbing radiation energy.

In some embodiments, the device, system, or method of any prior embodiments, wherein the radiation absorbing layer is positioned underneath the sample layer and in direct contact with the sample layer.

In some embodiments, the device, system, or method of any prior embodiments, wherein the radiation absorbing layer is configured to absorbing electromagnetic waves selected from the group consisting of: radio waves, microwaves, infrared waves, visible light, ultraviolet waves, X-rays, gamma rays, and thermal radiation.

In some embodiments, the device, system, or method of any prior embodiments, wherein at least one of the plates does not block the radiation that the radiation absorbing layer absorbs.

In some embodiments, the device, system, or method of any prior embodiments, wherein one or both of the plates have low thermal conductivity.

In some embodiments, the device, system, or method of any prior embodiments, wherein the uniform thickness of the sample layer is regulated by one or more spacers that are fixed to one or both of the plates.

In some embodiments, the device, system, or method of any prior embodiments, wherein the sample is a pre-mixed polymerase chain reaction (PCR) medium.

In some embodiments, the device, system, or method of any prior embodiments, 1, wherein the device is configured to facilitate PCR assays for changing temperature of the sample according to a predetermined program.

In some embodiments, the device, system, or method of any prior embodiments, wherein the device is configured to conduct diagnostic testing, health monitoring, environmental testing, and/or forensic testing.

In some embodiments, the device, system, or method of any prior embodiments, wherein the device is configured to conduct DNA amplification, DNA quantification, selective DNA isolation, genetic analysis, tissue typing, oncogene identification, infectious disease testing, genetic fingerprinting, and/or paternity testing.

In some embodiments, the device of any prior embodiments, wherein the sample layer is laterally sealed to reduce sample evaporation.

In some embodiments, the system of any of embodiments, further comprising a controller, which is configured to control the presence, intensity, wavelength, frequency, and/or angle of the electromagnetic waves.

In some embodiments, the system of any prior embodiments, further comprising a thermometer, which is configured to measure the temperature at or in proximity of the sample contact area and send a signal to the controller based on the measured temperature.

In some embodiments, the system or method of any prior embodiments, wherein the thermometer is selected from the group consisting of: fiber optical thermometer, infrared thermometer, liquid crystal thermometer, pyrometer, quartz thermometer, silicon bandgap temperature sensor, temperature strip, thermistor, and thermocouple.

In some embodiments, the system or method of any prior embodiments, wherein the controller is configured to control the present, intensity, wavelength, frequency, and/or angle of the electromagnetic waves from the radiation source.

In some embodiments, the system or method of any prior embodiments, wherein the radiation source and the radiation absorbing layer are configured that the electromagnetic waves cause an average ascending temperature rate ramp of at least 10° C./s; and the removal of the electromagnetic waves results in an average descending temperature rate ramp of at least 5° C./s.

In some embodiments, the device, system, or method of any prior embodiments, wherein the radiation source and the radiation absorbing layer are configured to create an average ascending temperature rate ramp of at least 10° C./s and an average descending temperature rate ramp of at least 5° C./s.

In some embodiments, the device, system, or method of any prior embodiments, wherein the radiation source and the radiation absorbing layer are configured to create an average ascending temperature rate ramp of at least 10° C./s to reach the initialization step, the denaturation step and/or the extension/elongation step during a PCR, and an average descending temperature rate ramp of at least 5° C./s to reach the annealing step and/or the final cooling step during a PCR.

In some embodiments, the device, system, or method of any prior embodiments, wherein the PCR sample comprises: template DNA, primer DNA, cations, polymerase, and buffer.

In some embodiments, the method of any prior embodiments, wherein the step of pressing the plates into a closed figuration comprises pressing the plates with an imprecise pressing force.

In some embodiments, the method of any prior embodiments, wherein the step of pressing the plates into a closed figuration comprises pressing the plates directly with human hands.

In some embodiments, the method of any prior embodiments, wherein the layer of highly uniform thickness has a thickness variation of less than 10%.

In some embodiments, the device, system, or method of any prior embodiments, further comprising reagents selected from DNA template, primers, DNA polymerase, deoxynucleoside triphosphates (dNTPs), bivalent cations (e.g. $Mg^{2+}$), monovalent cation (e.g. $K^{+}$), and buffer solution.

In some embodiments, the device, system, or method of any prior claims, wherein the changing temperature of the sample is a thermal cycling, wherein the thermal cycling is for amplification of nucleic acid using polymerase chain action (PCR), that is selected from a group of hot-start PCR, nested PCR, touchdown PCR, reverse transcription PCR, RACE PCR, and digital PCR.

In some embodiments, the device, system, or method of any prior claims, wherein the changing of the temperature of the sample is for isothermal amplification of nucleic acid, that is selected from a group of Loop-mediated isothermal amplification, strand displacement amplification, helicase-dependent amplification, nicking enzyme amplification, rolling circle amplification, and recombinase polymerase amplification.

Additional Embodiments

The present invention includes a variety of embodiments, which can be combined in multiple ways as long as the various components do not contradict one another. The embodiments should be regarded as a single invention file: each filing has other filing as the references and is also referenced in its entirety and for all purpose, rather than as a discrete independent. These embodiments include not only the disclosures in the current file, but also the documents that are herein referenced, incorporated, or to which priority is claimed.

(1) Definitions

The terms used in describing the devices, systems, and methods herein disclosed are defined in the current application, or in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosures of which are incorporated by reference herein in their entireties for all purposes.

The terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF card) that regulate the spacing between the plates. The term "X-plate" refers to one of the two plates in a CROF card, wherein the spacers are fixed to this plate. More descriptions of the COF Card, CROF Card, and X-plate are given in the provisional application Ser. No. 62/456,065, filed on Feb. 7, 2017, the complete disclosure of which is incorporated by reference herein in its entirety for all purposes.

(2) Q-Card, Spacer and Uniform Sample thickness

The devices, systems, and methods herein disclosed can include or use Q-cards, spacers, and uniform sample thickness embodiments for sample detection, analysis, and quantification. In some embodiments, the Q-card comprises spacers, which help to render at least part of the sample into a layer of high uniformity. The structure, material, function, variation and dimension of the spacers, as well as the uniformity of the spacers and the sample layer, are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosure of which are incorporated by reference herein in their entireties for all purposes.

(3) Hinges, Opening Notches, Recessed Edge and Sliders

The devices, systems, and methods herein disclosed can include or use Q-cards for sample detection, analysis, and quantification. In some embodiments, the Q-card comprises hinges, notches, recesses, and sliders, which help to facilitate the manipulation of the Q card and the measurement of the samples. The structure, material, function, variation and dimension of the hinges, notches, recesses, and sliders are herein disclosed, or listed, described, and summarized in PCT Application (designating U.S.) Nos. PCT/US2016/045437 and PCT/US0216/051775, which were respectively filed on Aug. 10, 2016, and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosure of which are incorporated by reference herein in their entireties for all purposes.

(4) Q-Card, Sliders, and Smartphone Detection System

The devices, systems, and methods herein disclosed can include or use Q-cards for sample detection, analysis, and quantification. In some embodiments, the Q-cards are used together with sliders that allow the card to be read by a smartphone detection system. The structure, material, function, variation, dimension and connection of the Q-card, the sliders, and the smartphone detection system are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosure of which are incorporated by reference herein in their entireties for all purposes.

(5) Detection Methods

The devices, systems, and methods herein disclosed can include or be used in various types of detection methods. The detection methods are herein disclosed, or listed, described, and summarized in PCT Application (designating U.S.) Nos. PCT/US2016/045437 and PCT/US0216/051775, which were respectively filed on Aug. 10, 2016, and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosures of which are incorporated by reference herein in their entireties for all purposes.

(6) Labels

The devices, systems, and methods herein disclosed can employ various types of labels that are used for analytes detection. The labels are herein disclosed, or listed, described, and summarized in PCT Application (designating U.S.) Nos. PCT/US2016/045437 and PCT/US0216/051775, which were respectively filed on Aug. 10, 2016, and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosure of which are incorporated by reference herein in their entireties for all purposes.

(7) Analytes

The devices, systems, and methods disclosed herein can be applied to manipulation and detection of various types of analytes (including biomarkers). The analytes and are herein disclosed, or listed, described, and summarized in PCT Application (designating U.S.) Nos. PCT/US2016/045437 and PCT/US0216/051775, which were respectively filed on Aug. 10, 2016, and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosures of which are incorporated by reference herein in their entireties for all purposes.

(8) Applications (Field and Samples)

The devices, systems, and methods disclosed herein can be used for various applications (fields and samples). The applications are herein disclosed, or listed, described, and summarized in PCT Application (designating U.S.) Nos. PCT/US2016/045437 and PCT/US0216/051775, which were respectively filed on Aug. 10, 2016, and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosures of which are incorporated by reference herein in their entireties for all purposes.

(9) Cloud

The devices, systems, and methods herein disclosed can employ cloud technology for data transfer, storage, and/or analysis. The related cloud technologies are herein disclosed, or listed, described, and summarized in PCT Application (designating U.S.) Nos. PCT/US2016/045437 and PCT/US0216/051775, which were respectively filed on Aug. 10, 2016, and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all disclosures of which are incorporated by reference herein in their entireties for all purposes.

Additional Notes

Further examples of inventive subject matter according to the present disclosure are described in the following enumerated paragraphs.

It must be noted that as used herein and in the appended claims, the singular forms “a”, “an”, and “the” include plural referents unless the context clearly dictates otherwise, e.g., when the word “single” is used. For example, reference to “an analyte” includes a single analyte and multiple analytes, reference to “a capture agent” includes a single capture agent and multiple capture agents, reference to “a detection agent” includes a single detection agent and multiple detection agents, and reference to “an agent” includes a single agent and multiple agents.

As used herein, the terms “adapted” and “configured” mean that the element, component, or other subject matter is designed and/or intended to perform a given function. Thus, the use of the terms “adapted” and “configured” should not be construed to mean that a given element, component, or other subject matter is simply “capable of” performing a given function. Similarly, subject matter that is recited as being configured to perform a particular function may additionally or alternatively be described as being operative to perform that function.

As used herein, the phrase, “for example,” the phrase, “as an example,” and/or simply the terms “example” and “exemplary” when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases “at least one of” and “one or more of,” in reference to a list of more than one entity, means any one or more of the entity in the list of entity, and is not limited to at least one of each and every entity specifically listed within the list of entity. For example, “at least one of A and B” (or, equivalently, “at least one of A or B,” or, equivalently, “at least one of A and/or B”) may refer to A alone, B alone, or the combination of A and B.

As used herein, the term “and/or” placed between a first entity and a second entity means one of (1) the first entity, (2) the second entity, and (3) the first entity and the second entity. Multiple entity listed with “and/or” should be construed in the same manner, i.e., “one or more” of the entity so conjoined. Other entity may optionally be present other than the entity specifically identified by the “and/or” clause, whether related or unrelated to those entities specifically identified.

Where numerical ranges are mentioned herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, unless otherwise indicated or otherwise evident from the context and understanding of one of ordinary skill in the art.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

Additional Notes

Further examples of inventive subject matter according to the present disclosure are described in the following enumerated paragraphs.

It must be noted that as used herein and in the appended claims, the singular forms “a”, “an”, and “the” include plural referents unless the context clearly dictates otherwise, e.g., when the word “single” is used. For example, reference to “an analyte” includes a single analyte and multiple analytes, reference to “a capture agent” includes a single capture agent and multiple capture agents, reference to “a detection agent” includes a single detection agent and multiple detection agents, and reference to “an agent” includes a single agent and multiple agents.

As used herein, the terms “adapted” and “configured” mean that the element, component, or other subject matter is designed and/or intended to perform a given function. Thus, the use of the terms “adapted” and “configured” should not be construed to mean that a given element, component, or other subject matter is simply “capable of” performing a given function. Similarly, subject matter that is recited as being configured to perform a particular function may additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

Where numerical ranges are mentioned herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, unless otherwise indicated or otherwise evident from the context and understanding of one of ordinary skill in the art.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

What is claimed is:

1. A device for changing a temperature of a thin fluidic sample layer, comprising: a first plate, a second plate, a radiation absorbing layer, and spacers, wherein:

(i) the first plate and the second plate are movable relative to each other into different configurations, including an open configuration and a closed configuration;

(ii) each of the plates comprises, on its respective surface, a sample contact area for contacting a fluidic sample, (iii) the plates have a configuration for changing a temperature of the fluidic sample;

(iv) the spacers have a predetermined uniform height that is equal to or less than 200 microns;

(v) at least one of the spacers is inside the sample contact area; wherein in the open configuration, the two plates are partially or completely separated apart, the spacing between the plates is not regulated by the spacers, and the fluidic sample is deposited on one or both of the plates; wherein in the closed configuration, which is configured after the fluidic sample is deposited in the open configuration, the two plates are parallel, at least a part of the fluidic sample is compressed by the two plates into a thin layer of uniform thickness and is stagnant relative to the plates, wherein the thin layer of the fluidic sample is confined by the sample contact areas of the two plates and is regulated by the plates and the spacers, and wherein the plates are configured to change the temperature of the fluidic sample at a rate of at least 10° C./sec;

wherein at least one of the two plates is a flexible plate; and wherein the spacers have an inter-spacer-distance, the fourth power of the inter-spacer-distance (ISD) divided by a thickness (h) and a Young's modulus (E) of one of the first and second flexible plates ($ISD^4/(hE)$) is 5×105 $\mu m^3$/GPa or less, and the thickness of one of the first and second flexible plates times the Young's modulus of the flexible plate is in the range of 60 to 750 GPa-μm.

2. The device of claim 1, wherein the radiation absorbing layer adjacent to the at least part of the sample compressed by the two plates.

3. A system for changing a temperature of a sample, comprising:

(i) the device of claim 2;

(ii) a radiation source, wherein the radiation source is configured to radiate electromagnetic waves that the radiation absorbing layer absorbs; and (iii) a controller configured to control the radiation source and change the temperature of the fluidic sample.

4. The device of claim 1, wherein the changing temperature of the fluidic sample is a thermal cycling that changes the temperature up and down in cyclic fashion.

5. The device of claim 1, wherein the changing temperature of the fluidic sample is a thermal cycling, wherein the thermal cycling is for amplification of nucleic acid using polymerase chain action (PCR).

6. The device of claim 1, wherein the changing of the temperature of the fluidic sample is for isothermal amplification of nucleic acid.

7. The device of claim 2, wherein the radiation absorbing layer comprises a disk-coupled dots-on-pillar antenna (D2PA) array, silicon sandwich, graphene, superlattice or other plasmonic materials, or a combination thereof.

8. The device of claim 2, wherein the radiation absorbing layer comprises carbon.

9. The device of claim 2, wherein the radiation absorbing layer is configured to radiate energy in the form of heat after absorbing radiation energy.

10. The device of claim 2, wherein the radiation absorbing layer is positioned underneath the thin layer of the fluidic sample and in direct contact with the thin layer of the fluidic sample.

11. The device of claim 2, wherein the radiation absorbing layer is configured to absorb electromagnetic waves selected from the group consisting of radio waves, microwaves, infrared waves, visible light, ultraviolet waves, X-rays, gamma rays, and thermal radiation.

12. The device of claim 2, wherein at least one of the plates does not block the radiation that the radiation absorbing layer absorbs.

13. The device of claim 1, wherein the thin layer of the fluidic sample is regulated by one or more of the spacers, and the one or more of the spacers are fixed to one or both of the plates.

14. The device of claim 1, wherein the fluidic sample is a pre-mixed polymerase chain reaction (PCR) medium.

15. The device of claim 1, wherein the device is configured to facilitate a polymerase chain reaction (PCR) assays for changing the temperature of the fluidic sample according to a predetermined program.

16. The device of claim 1, wherein the device is configured to conduct diagnostic testing, health monitoring, environmental testing, and/or forensic testing.

17. The device of claim 1, wherein the device is configured to conduct DNA amplification, DNA quantification, selective DNA isolation, genetic analysis, tissue typing, oncogene identification, infectious disease testing, genetic fingerprinting, and/or paternity testing.

18. The device of claim 1, wherein the thin layer of the fluidic sample is laterally sealed to reduce sample evaporation.

19. The system of claim 3, further comprising the controller is further configured to control the presence, intensity, wavelength, frequency, and/or angle of the electromagnetic waves from the radiation source.

20. The system of claim 19, further comprising a thermometer, which is configured to measure the temperature at or in proximity of the sample contact area and send a signal to the controller based on the measured temperature.

21. The system of claim 20, wherein the thermometer is selected from the group consisting of fiber optical thermometer, infrared thermometer, liquid crystal thermometer, pyrometer, quartz thermometer, silicon bandgap temperature sensor, temperature strip, thermistor, and thermocouple.

22. The system of claim 19, wherein the radiation source and the radiation absorbing layer are configured that the electromagnetic waves cause an average ascending temperature rate ramp of at least 10° C./s; and the removal of the electromagnetic waves results in an average descending temperature rate ramp of at least 5° C./s.

23. The system of claim 3, wherein the radiation source and the radiation absorbing layer are configured to create an average ascending temperature rate ramp of at least 10° C./s and an average descending temperature rate ramp of at least 5° C./s.

24. The system of claim 3, wherein the radiation source and the radiation absorbing layer are configured to create an average ascending temperature rate ramp of at least 10° C./s to reach an initialization step, a denaturation step and/or an extension/elongation step during a polymerase chain reaction (PCR), and an average descending temperature rate ramp of at least 5° C./s to reach an annealing step and/or an final cooling step during a PCR.

25. The system of claim 24, wherein the fluidic sample comprises a template DNA, a primer DNA, cations, a polymerase, or a buffer.

26. The device of claim 1, wherein the changing temperature of the fluidic sample is a thermal cycling, wherein the thermal cycling is for amplification of nucleic acid using polymerase chain action (PCR) that is selected from the group consisting of hot-start PCR, nested PCR, touchdown PCR, reverse transcription PCR, RACE PCR, and digital PCR.

27. The device of claim 1, wherein the changing of the temperature of the fluidic sample is for isothermal amplification of nucleic acid that is selected from the group consisting of Loop-mediated isothermal amplification, strand displacement amplification, helicase-dependent amplification, nicking enzyme amplification, rolling circle amplification, and recombinase polymerase amplification.

28. The device of claim 1, further comprising reagents selected from the group consisting of DNA template, primers, DNA polymerase, deoxynucleoside triphosphates (dNTPs), bivalent cations monovalent cation, and buffer solution.

29. The device of claim 1, further comprising a hinge that connects the first plate and the second plate, wherein the two plates are capable of rotating relative to each other around the hinge.

30. The device of claim 2, further comprising a radiation source configured to radiate electromagnetic waves that the radiation absorbing layer absorbs, and a controller configured to control presence, intensity, wavelength, frequency, and/or angle of the electromagnetic waves.

31. The device of claim 30, further comprising a thermometer configured to measure the temperature at or in proximity of the sample contact area and send a signal to the controller based on the measured temperature.

32. The device of claim 31, wherein the thermometer selected from the group consisting of fiber optical thermometer, infrared thermometer, liquid crystal thermometer, pyrometer, quartz thermometer, silicon bandgap temperature sensor, temperature strip, thermistor, and thermocouple.

33. The device of claim 1, further comprising a radiation source, wherein the radiation source and the radiation absorbing layer are configured such that the electromagnetic waves cause an average ascending temperature rate ramp of at least 10° C./s; and a removal of the electromagnetic waves results in an average descending temperature rate ramp of at least 5° C./s.

34. The device of claim 1, further comprising a radiation source, wherein the radiation source and the radiation absorbing layer are configured to create an average ascending temperature rate ramp of at least 10° C./s to reach an initialization step, a denaturation step and/or an extension/elongation step during a polymerase chain reaction (PCR), and an average descending temperature rate ramp of at least 5° C./s to reach an annealing step and/or a final cooling step during a PCR.

35. The device of claim 1, further comprising a radiation source, wherein the radiation source and the radiation absorbing layer are configured to perform a polymerase chain reaction (PCR), and wherein the PCR uses reagents comprising: template DNA, primer DNA, cations, polymerase, and buffer.

36. The device of claim 1, wherein the uniform thickness of thin layer of the fluidic sample is 50 μm or less in the closed configuration.

37. The device of claim 1, wherein the uniform thickness of thin layer of the fluidic sample is 10 μm or less in the closed configuration.

38. The device of claim 1, further comprising a reagent on at least the first plate or the second plate.

39. The device of claim 1, further comprising:

a radiation source configured to radiate electromagnetic waves that the radiation absorbing layer absorbs; and a controller configured to control the radiation source and change the temperature of the fluidic sample.

40. The device of claim 1, wherein the uniform thickness of thin layer of the fluidic sample is in a range of 10 μm to 20 μm in the closed configuration.

* * * * *